US009561610B2

(12) United States Patent
Hanaoka et al.

(10) Patent No.: US 9,561,610 B2
(45) Date of Patent: Feb. 7, 2017

(54) INJECTION MOLDING METHOD AND APPARATUS THEREFOR

(75) Inventors: Atsushi Hanaoka, Tochigi (JP); Kazuhiro Kawano, Tochigi (JP); Suguru Nakai, Tochigi (JP); Yoko Kakizaki, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 219 days.

(21) Appl. No.: 14/127,362

(22) PCT Filed: Jun. 22, 2012

(86) PCT No.: PCT/JP2012/066057

§ 371 (c)(1), (2), (4) Date: Dec. 18, 2013

(87) PCT Pub. No.: WO2012/176900

PCT Pub. Date: Dec. 27, 2012

(65) Prior Publication Data

US 2014/0117576 A1 May 1, 2014

(30) Foreign Application Priority Data

Jun. 24, 2011 (JP) ................................ 2011-141190
Apr. 11, 2012 (JP) ................................ 2012-090194

(51) Int. Cl.
*B29C 45/27* (2006.01)
*B29C 45/26* (2006.01)
(Continued)

(52) U.S. Cl.
CPC ....... *B29C 45/2737* (2013.01); *B29C 45/2669* (2013.01); *B29C 45/28* (2013.01); *B29C 45/30* (2013.01); *B29C 2045/308* (2013.01)

(58) Field of Classification Search
CPC ................ B29C 45/2737; B29C 45/30; B29C 2045/308; B29C 45/28; B29C 45/2669
(Continued)

(56) References Cited

U.S. PATENT DOCUMENTS 3,140,332 A * 7/1964 Brown .................... B29C 45/50 264/328.14
4,397,806 A * 8/1983 Hettinga ................ B29C 45/54 264/328.14

(Continued)

FOREIGN PATENT DOCUMENTS

CN 101332657 12/2008
JP 05-124076 5/1993

(Continued)

OTHER PUBLICATIONS

Chinese Office Action dated Apr. 3, 2015, 11 pages.
Japanese Office Action dated Sep. 8, 2015, 3 pages.
Japanese Office Action issued Sep. 9, 2014, 3 pages.

*Primary Examiner* — Nahida Sultana
(74) *Attorney, Agent, or Firm* — Rankin, Hill & Clark LLP

(57) ABSTRACT

An injection molding apparatus includes an injector that obtains molten resin by melting resin, and injects the molten resin, a hot runner that is a flowing path of the molten resin, and a temperature rising part that is provided in a part of the hot runner, and increases a temperature of the molten resin to be higher than a melting temperature in the injector.

9 Claims, 29 Drawing Sheets

1014 1080 1078 1042 1070 1012 1060 1040 1052 1022 1026 1010 1086 66 82 1044 1084 1074 1062 1064 1072 1054 1058 1056 1055 1018 1028 1032 1024 1046 1020 1038 1036 1038 1034 1030 1016

To a product part

(51) Int. Cl.
*B29C 45/28* (2006.01)
*B29C 45/30* (2006.01)

(58) Field of Classification Search
USPC ....... 425/549, 550, 542, 570, 564, 215, 206; 264/328.14, 69, 327
See application file for complete search history.

(56) References Cited

U.S. PATENT DOCUMENTS 4,634,366 A * 1/1987 Brun .................... B29C 45/26 264/328.14
4,675,141 A * 6/1987 Kumazaki ........... B29C 45/1703 264/328.14
4,908,169 A * 3/1990 Galic ..................... B29C 45/47 264/328.14
4,965,028 A * 10/1990 Maus .................... B01D 29/44 264/297.2
5,007,821 A * 4/1991 Schmidt ............. B29C 45/2725 264/328.14
5,034,177 A * 7/1991 Niimi ..................... B29B 13/02 264/328.14
5,334,008 A * 8/1994 Gellert ............... B29C 45/2806 264/328.12
6,113,828 A * 9/2000 Feick ................. B29C 45/2669 264/161
6,544,028 B2 * 4/2003 Wright ............... B29C 45/2725 264/328.12
7,198,400 B2 * 4/2007 Unterlander .......... B01F 5/0645 366/336
7,393,198 B2 * 7/2008 Niewels ............. B29C 45/2703 425/145
7,614,872 B2 * 11/2009 Olaru .................... B01F 5/0646 264/328.12
2001/0011067 A1 * 8/2001 Allan .................... C11D 13/16 510/152
2002/0105113 A1 * 8/2002 Wright ............... B29C 45/2725 264/349
2006/0103045 A1 * 5/2006 O'Brien-Bernini . B29C 47/0004 264/45.9
2006/0113695 A1 * 6/2006 De Maria .............. B29B 7/905 264/102
2006/0222727 A1 * 10/2006 Iwata ................. B29C 47/0019 425/208
2007/0003654 A1 * 1/2007 Morimoto ................ B01F 7/04 425/208
2007/0298141 A1 * 12/2007 Barth ..................... B29C 45/28 425/557
2008/0023862 A1 * 1/2008 Niewels ............. B29C 45/2703 264/40.1
2008/0065356 A1 * 3/2008 Kato ...................... B29C 45/52 702/183
2008/0088047 A1 * 4/2008 Trudeau ................. B29C 45/27 264/40.1
2008/0290542 A1 11/2008 Olaru
2013/0285274 A1 * 10/2013 Woodworth ........ B29C 44/3446 264/53

FOREIGN PATENT DOCUMENTS

JP 09-039055 2/1997
JP 11-105079 4/1999
JP 2002-11763 1/2002
JP 2003-154562 5/2003
JP 2004-209955 7/2004
JP 2006-346941 12/2006
JP 2007-090666 4/2007
JP 2008-207482 9/2008
JP 2008-302655 12/2008

* cited by examiner 1010
1032
1028
1024
1034
1026
1030
1018
1016
1022
1052
1055
1038
1036
1038
1056
1020
1040
1058
1060
1012
1054
1072
1070
1062
1078
66
82
1064
1042
1074
1080
1044
1084
1014
1086
1046
To a product part 1052
1040
(1058)
1060
1012
1070
1042
1080
1100
1056
1054
1072
1078
1062
1064
1074
1066
1082
1044
1084
1014
1086
1046

1052
1102
1040
(1058)
1056
1060
1054
1012
1070
1072
1078
1062
1042
1064
1074
1080
1066
1082
1100
1044
1084
1014
1086
1046

10
12
14
16
18
20
22
24
26
28
30
32
34
36
38
40
42
44
46
48
50
52
54
56
58
60
62
70

54
22
24
36
38
42
40
56
46
44
58
70
60
48
62
70
12
52
14
50
16

54
56
58
22
62
24
60
36
40
38
42
44
70
46
48
70
12
50
52
14
16

54
56
58
22
62
24
60
36
38
40
42
44
70
46
48
70
12
52
52
14
16

42
70
48
44
46
12
52
50
60
16
58
14
96
94
98
90
92
98

42
70
48
44
46
12
52
50
16
60
14
58
104
106
102
108
110
100

42
46
70
48
44
12
52
50
16
60
14
104
58
102
110
108
104
100
106

10
54
56
58
62
22
24
60
30
32
28
26
20
18
34
36
36
38
40
42
44
120
70
46
48
70
12
14
16
50
52

INJECTION MOLDING METHOD AND APPARATUS THEREFOR

TECHNICAL FIELD

The present invention relates to an injection molding method and an injection molding apparatus, which obtain a molded product by filling molten resin in a cavity formed in a mold.

BACKGROUND ART

Injection molding is well known as a method of obtaining a molded product by supplying molten resin injected from an injector to a cavity formed in a mold, and then curing the molten resin by cooling.

In injection molding, resin is melted in an injector, and obtained molten resin is injected from the injector and flowed in a hot runner. The molten resin is further led to a product part forming a part of cavity, via a spool, a gate, and the like formed in a mold. Just before (an upstream side of) a cavity, a nozzle may be disposed as described in Patent Document 1, for example, and the molten resin may be led out from a nozzle and supplied to a cavity.

A temperature of a hot runner is kept at 200-220° C., for example, and a temperature of a mold is substantially at a room temperature. Therefore, the molten resin injected into a cavity is deformed (namely, molded) along the shape of the cavity, cured while decreasing a temperature by heat being removed, and formed as a molded product.

In such injection molding, it is attempted to decrease the amount of resin to lower the product cost, or to produce a thin-wall product with a small thickness dimension (wall thickness) for the purpose of obtaining a lightweight molded product to decrease CO2 emissions. However, in this case, if the injection conditions are the same as those for molding a thick-wall product, a flowing distance of molten resin may be shorten.

When such a situation occurs, for example, molten resin does not reach an end of the product part. In other words, a filling defect occurs and a corresponding portion is lost, or so-called deformation occurs and a defective molded product is produced.

For avoiding such a problem, it is considered to increase a molten resin injection pressure. In this case, a pressing force to molten resin is increased, and a flowing distance of molten resin is expected to increase. However, when a molten resin injection pressure is increased, a burr is likely to occur on a parting surface, especially near a gate. Thus, it is also considerable to increase a mold clamping pressure to narrow a gap causing a burr as much as possible. However, for obtaining a high mold clamping pressure, a large size or high power displacement mechanism is necessary for mold clamping/opening by displacing a movable mold. Thus, an injection molding apparatus is increased in size and weight. Further, such a displacement mechanism is generally expensive, and increases a capital investment.

From the above viewpoint, Patent Document 2 has proposed a method of molding a resin molded product having a thin-wall portion at a low equipment cost. The method comprises forming first and second resin paths in a mold, opening a valve provided in the second resin path after molten resin that is led to a product part from the first resin path passes through a portion forming a thin-wall portion, and supplying the molten resin from the second resin path to an unfilled portion of the product part.

In the related art described in the Patent Document 2, for storing a valve opening timing, or a timing of supplying molten resin from the second resin path, in a control unit, it is necessary to previously determine a relationship between an elapsed time after start of molten resin injection and a molten resin reaching position in a product part by repeating tests. This is troublesome, and takes a long time for performing the tests.

As described in the paragraph [0027] of the Patent Document 2, it is also considerable to provide a detection unit in a product part, and to detect that molten resin passes through a predetermined position by using the detection unit. However, in this case, a molten resin injection pressure must be changed depending on the position of the detection unit.

Thus, it is considered to increase a temperature of molten resin and decrease a viscosity of molten resin by setting a high temperature for melting resin in an injector, and to lead the molten resin into a cavity after maintaining the high temperature/low viscosity state in a hot runner. However, in this case, according to the inventor's intensive studies, a molded product with an insufficient strength may be often produced due to a change in physical properties of the molten resin.

Moreover, the injection molding apparatus disclosed in the Patent Document 2 is of a so-called multipoint gate type, in which a plurality of gates is present for leading molten resign to a product part. Thus, a weld line is formed, degrading the external appearance quality of molded product. In addition, a plurality of valve gates must be provided, increasing mold costs.

PRIOR ART DOCUMENT

Patent Document

Patent Document 1: JP-A-11-105079

Patent Document 2: JP-A-2003-154562

SUMMARY OF INVENTION

Embodiments of the invention relate to an injection molding method and an injection molding apparatus, which can fill molten resin in an entire product part, avoid an increase in size and weight of an injection molding apparatus, avoid an increase of capital investment, obtain a molded product with a sufficient strength, reduce a cycle time to obtain a molded product, and avoid falling off of a molded product during mold opening.

DESCRIPTION OF EMBODIMENTS

An injection molding apparatus and an injection molding method according to embodiments will be explained in detail with reference to the accompanying drawings.

Figure 1:
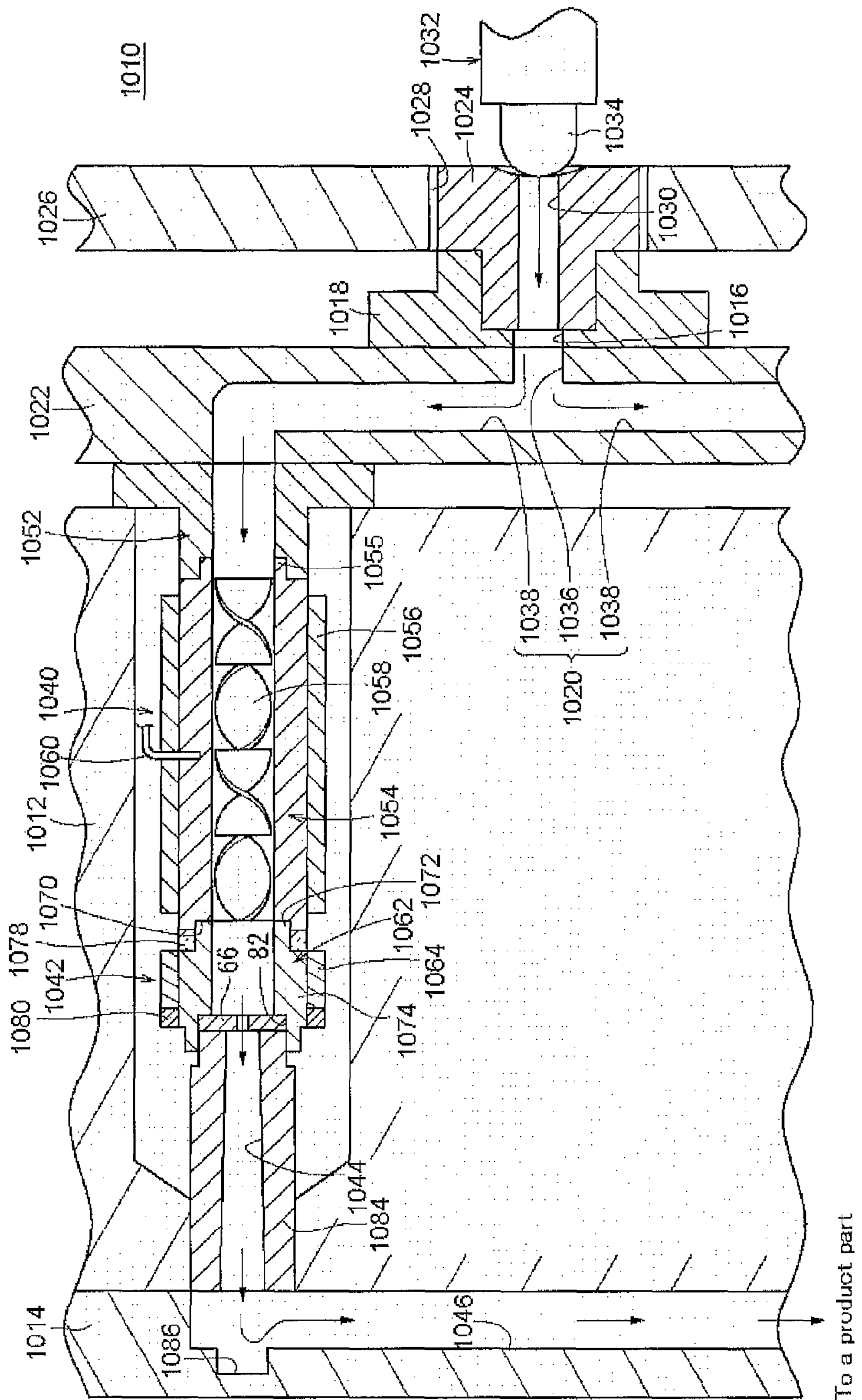
FIG. 1 is a schematic longitudinal sectional view of relevant parts of an injection molding apparatus according to a first embodiment.

FIG. 1 is a schematic longitudinal sectional view of relevant parts of an injection molding apparatus 1010 according to a first embodiment. The injection molding apparatus 1010 comprises a fixed mold 1012, and a movable mold 1014 that moves close to or apart from the fixed mold 1012 under the action of a not-shown displacement mechanism.

The fixed mold 1012 is additionally provided with a first hot runner block 1018 in which a first hot runner 1016 is formed. On the downstream side of the first hot runner block 1018, a second hot runner block 1022 in which a second hot runner 1020 is formed is provided.

A touch piece 1024 is provided in the first hot runner block 1018. A lead hole 1030 is formed as a through hole in the touch piece 1024. An injection nozzle 1034 of an injector 1032 is seated on an opening of the lead hole 1030.

The first hot runner 1016 communicates with the lead hole 1030. The second hot runner 1020 comprises a communication path 1036 communicating with the first hot runner 1016, and a plurality of branch paths 1038 branching radially from the communication path 1036. FIG. 1 shows two out of the branch paths 1038 spaced 180° each other.

Figure 2:
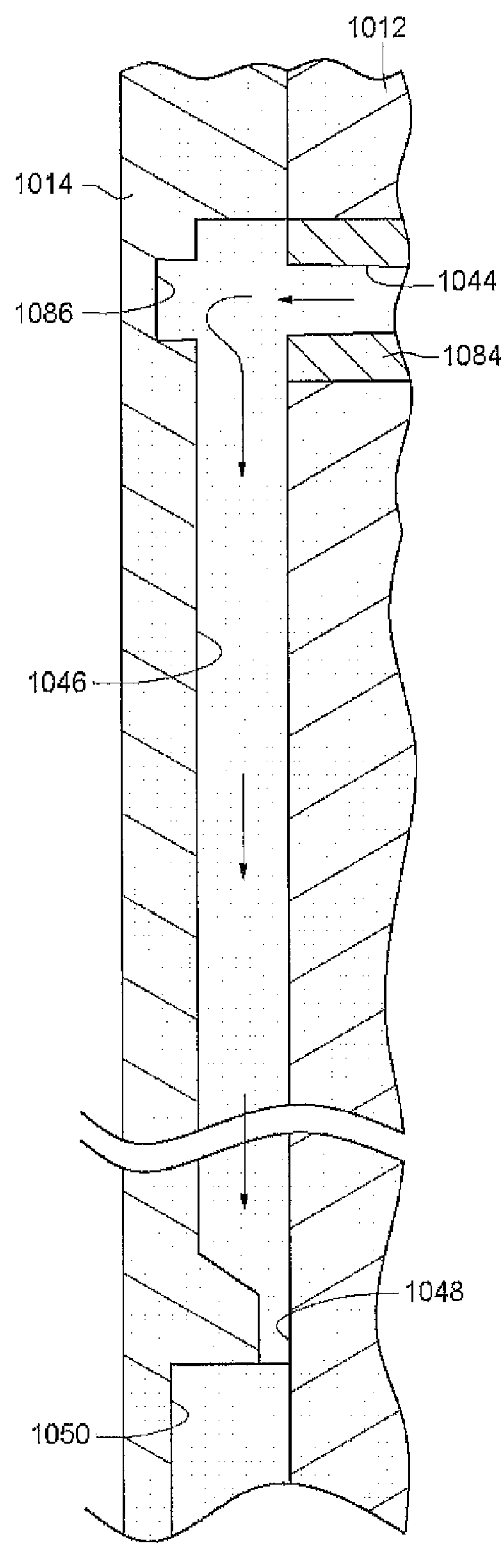
FIG. 2 is a schematic longitudinal sectional view of other parts of the injection molding apparatus of FIG. 1.

The branch path 1038 passes through a temperature rising part 1040 as an end portion of the second hot runner 1020, and communicates with a product part 1050 via a cobwebbing prevention part 1042, a spool 1044, a runner 1046, and a gate 1048 (refer to FIG. 2).

In the vicinity of the first hot runner 1016 and second hot runner 1020, a not-shown heating unit such as a heater is provided. Therefore, the molten resin flowing in the first hot runner 1016 and second hot runner 1020 is kept at a predetermined temperature between 200° C. and 220° C., for example.

The second hot runner 1020 is provided with a temperature rising part 1040 so as to connect to the branch path 1038 via a hot nozzle 1052 (refer to FIG. 1).

In the first embodiment, the temperature rising part 1040 is formed by winding a first band heater 1056 around an outer circumferential wall of a static mixer 1054. A small diameter end portion 1055 of the static mixer 1054 is threaded. The threaded portion is engaged with a threaded portion provided in an end portion of the hot nozzle 1052.

The static mixer 1054 is, as well known, a tubular member provided with a mixing blade 1058 inside. The molten resin flowing in the static mixer 1054 moves along a shape of the mixing blade 1058 when passing through the mixing blade 1058. While moving, the molten resin is stirred. As seen from this fact, the static mixer 1054 is a stirring unit not requiring power.

The first band heater 1056 wound around the outer circumferential wall of the static mixer 1054 transfers heat to the mixing blade 1058 through the outer circumferential wall. Therefore, the heat is transferred also to the molten resin passing through the mixing blade 1058, and a shearing heat is generated depending on a shape of the mixing blade 1058. As a result, a temperature of the molten resin is increased. In other words, the temperature rising part 1040 is configured to raise the temperature of the molten resin flowing in the temperature rising part 1040. A temperature of the temperature rising part 1040 is controlled depending on a value measured through a first thermocouple 1060.

The cobwebbing prevention part 1042 continues to the temperature rising part 1040. The cobwebbing prevention part 1042 comprises a tubular member 1062, a second band heater 1064 wound around an outer circumference wall of the tubular member 1062, and a cobwebbing prevention ring 1066 housed inside the tubular member 1062.

In an end portion of the static mixer 1054, a threaded step part 1070 is formed in being recessed along the axial direction. On the other hand, the tubular member 1062 includes a small diameter part 1072 and a large diameter part 1074 in this order from the side close to the static mixer 1054. The small diameter part 1072 closest to the static mixer 1054 is inserted into the threaded step part 1070. The small diameter part 1072 has a threaded portion, which is engaged with the threaded portion of the threaded step part 1070.

A ring-shaped heat insulating member 1078 is externally fitted to the outer circumferential wall of the small diameter part 1072. By heat insulating member 1078, the static mixer 1054 and tubular member 1062 are thermally isolated. In other words, the heat of the static mixer 1054 is prevented from transferring to the tubular member 1062.

The second band heater 1064 is wound around an outer circumferential wall of the large diameter part 1074 of the tubular member 1062. A second thermocouple 1080 contacts the large diameter part 1074. The first band heater 1056, second band heater 1064, first thermocouple 1060, and second thermocouple 1080 are electrically connected to a not-shown control circuit. Therefore, the calorific values of the first band heater 1056 and second band heater 1064 are adjusted under the control action of the control circuit, depending on the temperatures of the temperature rising part 1040 and cobwebbing prevention part 1042 detected by the first thermocouple 1060 and second thermocouple 1080. As described later, a temperature of the cobwebbing prevention part 1042 is set to be lower than that of the temperature rising part 1040.

In the tubular member 1062, a housing recessed portion 1082 is formed in the large diameter part 1074. The cobwebbing prevention ring 1066 is housed in the housing recessed portion 1082. The cobwebbing prevention ring 1066 is widely used in injection molding of molten resin, and is well known to those skilled in the art. Therefore, detailed explanation thereof is omitted.

The housing recessed portion 1082 houses also a nozzle tip 1084, provided with a spool 1044. The outer diameter of the nozzle tip 1084 is substantially constant, but the diameter of the spool 1044 formed inside the nozzle tip 1084 is gradually increased as if tapered from an end portion of the side (the upstream side) close to the tubular member 1062 toward an end portion of the side (the downstream side) apart from the tubular member.

In the movable mold 1014, a slag well 1086 is formed extending along the axial direction of the spool 1044. The total sum of the volume of the slag well 1086 and each of the spool 1044, the runner 1046, and the gate 1048 is set greater than the volume of the static mixer 1054. Therefore, the entire molten resin remained in the static mixer 1054 forms a skin layer in the spool 1044, slag well 1086, runner 1046, and gate 1048 at the time of next injection molding.

The runner 1046 communicates with the slag well 1086. The axial direction of the runner 1046 is substantially orthogonal to the axial direction of the spool 1044. Thus, the flowing direction of the molten resin led out from the spool 1044 is changed by the runner 1046.

In the downstream of the runner 1046, as shown in FIG. 2, agate 1048 communicating with the runner 1046, and a product part 1050 communicating with the runner 1046 through the gate 1048 are formed. As described above, the product part 1050 is positioned on a mating surface of the fixed mold 1012 and movable mold 1014.

In FIG. 1 and FIG. 2, the temperature rising part 1040, spool 1044, and runner 1046 are magnified to facilitate understanding. The scales in FIG. 1 and FIG. 2 do not correspond to actual dimensions. For example, an axial dimension (length) of the static mixer 1054 is actually set to be extremely smaller than those of the branch path 1038 and second hot runner 1020. In other words, the flowing distance of molten resin in the static mixer 1054 is shorter than the flowing distances of molten resin in the branch path 1038 and second hot runner 1020.

The injection molding apparatus 1010 according to the first embodiment is basically configured as described above. Next, the functions and effects of the injection molding apparatus 1010 will be explained in relation to an injection molding method implemented in the injection molding apparatus 1010.

For injection molding, first, the movable mold 1014 is displaced toward the fixed mold 1012 under the action of the not-shown displacement mechanism, and the mold is clamped. Before or after that, resin is molten at a predetermined temperature in the injector 1032 to obtain molten resin.

Next, the molten resin is injected from the injection nozzle 1034 of the injector 1032. The injected molten resin reaches the first hot runner 1016 through the lead hole 1030 formed in the touch piece 1024, and then reaches the branch path 1038 through the communication path 1036 of the second hot runner 1020. The molten resin flows further along each of the branch paths 1038.

As described above, the first hot runner 1016 and second hot runner 1020 are heated by a not-shown heating unit (a heater or the like). Thus, the molten resin flows in the first hot runner 1016 and second hot runner 1020 in being kept substantially at a melting temperature. Of course, this temperature can ensure a sufficient strength when the molten resin is cured by cooling to become a molded product.

A melting temperature or a holding temperature is set in accordance with types of molten resin, generally between 200° C.-220° C., more preferably between 205° C.-215° C.

The molten resin flowing in the branch path 1038 of the second hot runner 1020 is led out from the hot nozzle 1052 to the inside of the static mixer 1054 constituting the temperature rising part 1040. Heat from the first band heater 1056 is transferred to the static mixer 1054 so that the inside of the static mixer 1054 is heated to be higher than a melting temperature in the injector 1032. Therefore, the heat is also transferred to the molten resin passing through the mixing blade 1058. As a result, the molten resin is heated to be higher than the melting temperature in the injector 1032 or the temperature while flowing in the branch path 1038, and the viscosity is lowered accordingly.

A setting temperature of the static mixer 1054 is preferably 10° C.-150° C., more preferably 20° C.-100° C. higher than the melting temperature in the injector 1032. Such temperatures can avoid production of a molded product with an insufficient strength.

The molten resin is heated by receiving a shearing force while passing through the mixing blade 1058. In other words, the molten resin temperature is increased only by passing through the mixing blade 1058. If the temperature increase is sufficient, the static mixer 1054 may be set to the same temperature as the melting temperature in the injector 1032.

The power consumption of the injection molding apparatus 1010 can be suppressed by setting the melting temperature in the injector 1032 to a minimum value required to melt the resin, and setting the temperature of the temperature rising part 1040 to a minimum value required to obtain the viscosity of molten resin required to fill in the entire product part 1050.

Figure 3:
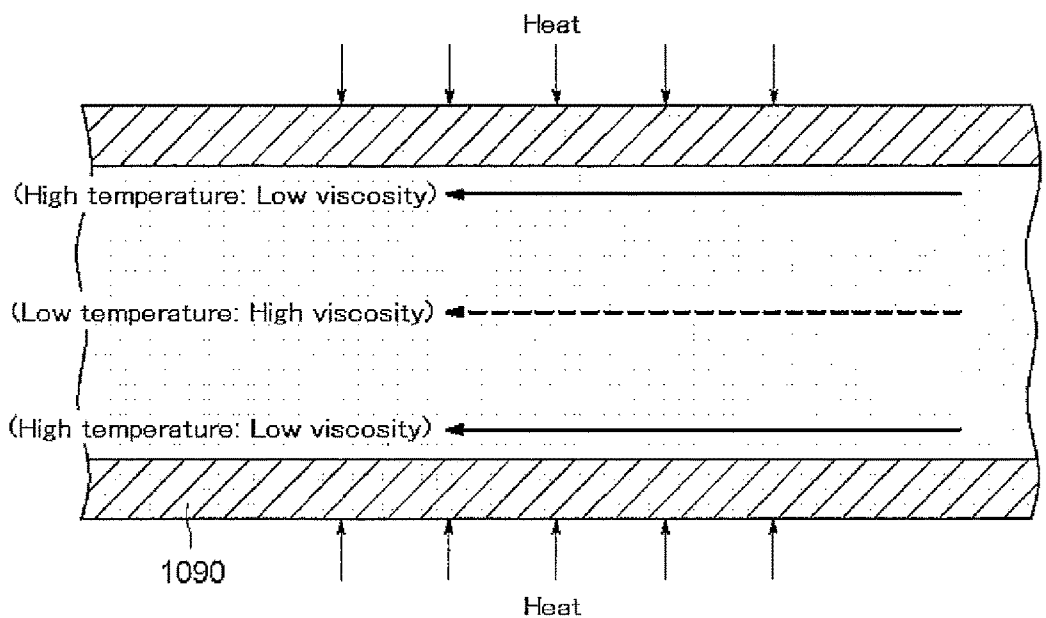
FIG. 3 is a schematic side sectional view showing temperature variations in fluid flowing in a straight tube.

In a case where a simple straight tube 1090 is disposed in the temperature rising part 1040 (refer to FIG. 3), actually, temperature variations occur inside the straight tube 1090. In other words, a temperature is high in a part close to the inner circumferential wall, and is low in a part close to the diameter center. Thus, temperature variations occur also in the molten resin flowing in the straight tube 1090, and it may not be easy to obtain the same viscosity of molten resin in any part in the straight tube 1090.

Figure 4:
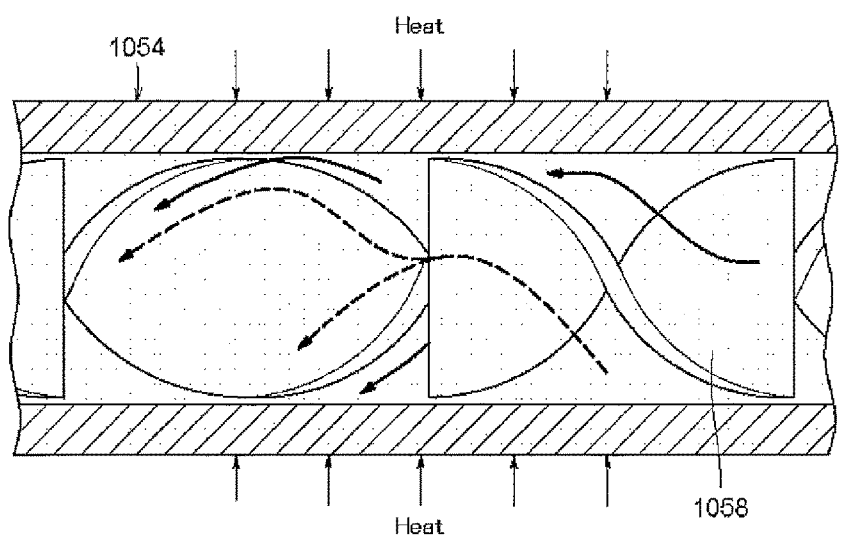
FIG. 4 is a schematic side sectional view showing a fluid flowing state in a static mixer.

Contrarily, in the embodiment provided with the static mixer 1054, as shown in FIG. 4, along with passing the molten resin through the mixing blade 1058, the molten resin close to the inner circumference wall moves toward the diameter center, and the molten resin close to the diameter center moves toward the inner circumferential wall. Thus, the molten resin moved close to the first band heater 1056 as a heat source and heated to a relatively high temperature and the molten resin moved away from the first band heater 1056 and kept at a relatively low temperature are continuously mixed and flowed in the static mixer 1054. Therefore, occurrence of temperature variations in molten resin can be avoided. As a result, it is possible to obtain the molten resin with substantially the same temperature, or with substantially the uniform viscosity, in any part.

Moreover, even if a starting material is a master batch material or metallic dyed material, such a material is sufficiently dispersed by stirring of the static mixer 1054, and it is possible to obtain a molded product with excellent external appearance quality. Further, after first time injection molding, when second time injection molding is performed by changing the color and type of the starting material, even if the molten resin injected in the first time injection molding remains and mixes with newly injected molten resin, both molten resins are sufficiently stirred by the static mixer 1054, and a defective appearance such as a stripe, for example, caused by the remained molten resin is difficult to occur in a molded product. This can decrease the number of defective products.

In addition, use of the static mixer 1054 does not require power for stirring. This avoids a complex configuration of the injection molding apparatus 1010. At the same time, an increase of mold investment can be avoided, and power consumption is not increased.

The molten resin passed through the temperature rising part 1040 is led to the cobwebbing prevention part 1042. The cobwebbing prevention part 1042 is set to a temperature of 50° C.-100° C., typically about 80° C. lower than the temperature rising part 1040. However, the length of the tubular member 1062 is extremely shorter than the length of the static mixer 1054, and the mixing blade 1058 is not present in the tubular member 1062. Thus, the molten resin flowing in the cobwebbing prevention part 1042 is led out from the cobwebbing prevention ring 1066 to the spool 1044 without substantially decreasing the temperature.

After passing through the spool 1044, the molten resin is led to the product part 1050 via the runner 1046 and gate 1048 (refer to FIG. 2). As described above, the viscosity of molten resin is lowered by that the molten resin temperature is increased in the temperature rising part 1040. Therefore, the flowing distance is increased, and even if there is a portion forming a thin wall portion in the product part 1050, the molten resin easily passes through the portion, and reaches an end portion of the product part 1050.

The product part 1050 is usually adjusted to substantially a room temperature. Therefore, the molten resin led to the product part 1050 is cooled and cured by that the heat is removed. Thereby, a molded product can be obtained.

Before being led to the temperature rising part 1040, the molten resin is kept at a temperature capable of ensuring a sufficient strength when it is cooled and cured to become a molded product, and is flowed in the second hot runner 1020, communication path 1036, and branch path 1038. Thereafter, the molten resin passes through the temperature rising part 1040, but the flowing time is short. In other words, the time while the molten resin temperature is higher than the melting temperature in the injector is short. Thus, a change in physical properties of the molten resin can be avoided, and a molded product with a sufficient strength can be obtained. Moreover, as the molten resin has reached to the end portion of the product part 1050 and cured by cooling, occurrence of defects in the molded product can be avoided.

Further, it is unnecessary to increase a molten resin injection pressure, and it is unnecessary to increase a mold clamping pressure to avoid occurrence of burrs. Therefore, a displacement mechanism (a hydraulic cylinder or the like) for clamping and opening a mold may be compact. This avoids an increase in the size and weight of the injection molding apparatus 1010. Further, as an expensive displacement mechanism is unnecessary, an increase of capital investment can be avoided.

Moreover, in the embodiment, a multipoint gate is not used, and it is unnecessary to worry about occurrence of a weld line. In addition, it is only necessary to control a temperature of the temperature rising part 1040, and it is unnecessary to repeat a test for setting injection conditions.

By opening a mold by separating the movable mold 1014 from the fixed mold 1012 under the action of the displacement mechanism, a molded product can be exposed. A molded product is pushed out by a knockout pin (not shown), for example, and separated from the injection molding apparatus 1010.

A molded product is obtained as a piece that the resin remained and cured by cooling in the spool 1044, runner 1046, and gate 1048 is integrally connected to a product part. Such a portion is cut off from a product part of a molded product, and crushed for use as a starting material in the next injection molding.

In the embodiment, the cobwebbing prevention part 1042 is provided. When molten resin remains in the cobwebbing prevention part 1042 for a long time, the molten resin temperature is decreased to be lower than the temperature while passing through the temperature rising part 1040. Because, the cobwebbing prevention part 1042 has been set to a temperature lower than the temperature rising part 1040. Further, the fact that transfer of the heat of the static mixer 1054 to the tubular member 1062 is suppressed by the heat insulating material 1078 contributes to keep the temperature of the cobwebbing prevention part 1042 lower than the temperature rising part 1040.

The molten resin decreased in temperature is sufficiently lowered in viscosity. Further, the cobwebbing prevention part 1042 is provided with the cobwebbing prevention ring 1066. These are combined to prevent occurrence of cobwebbing during mold opening.

Figure 5:
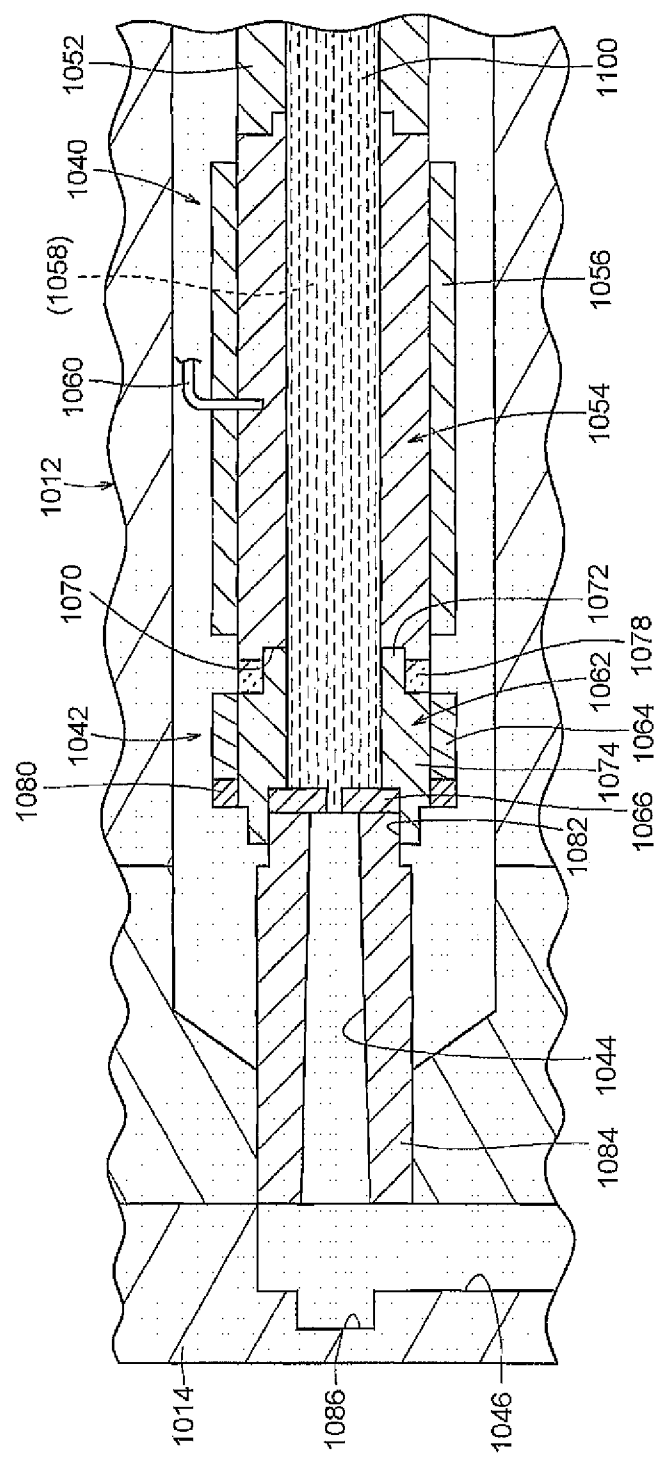
FIG. 5 is a schematic longitudinal sectional view of relevant parts showing a state that molten resin remains in a temperature rising part after injection molding.
Figure 6:
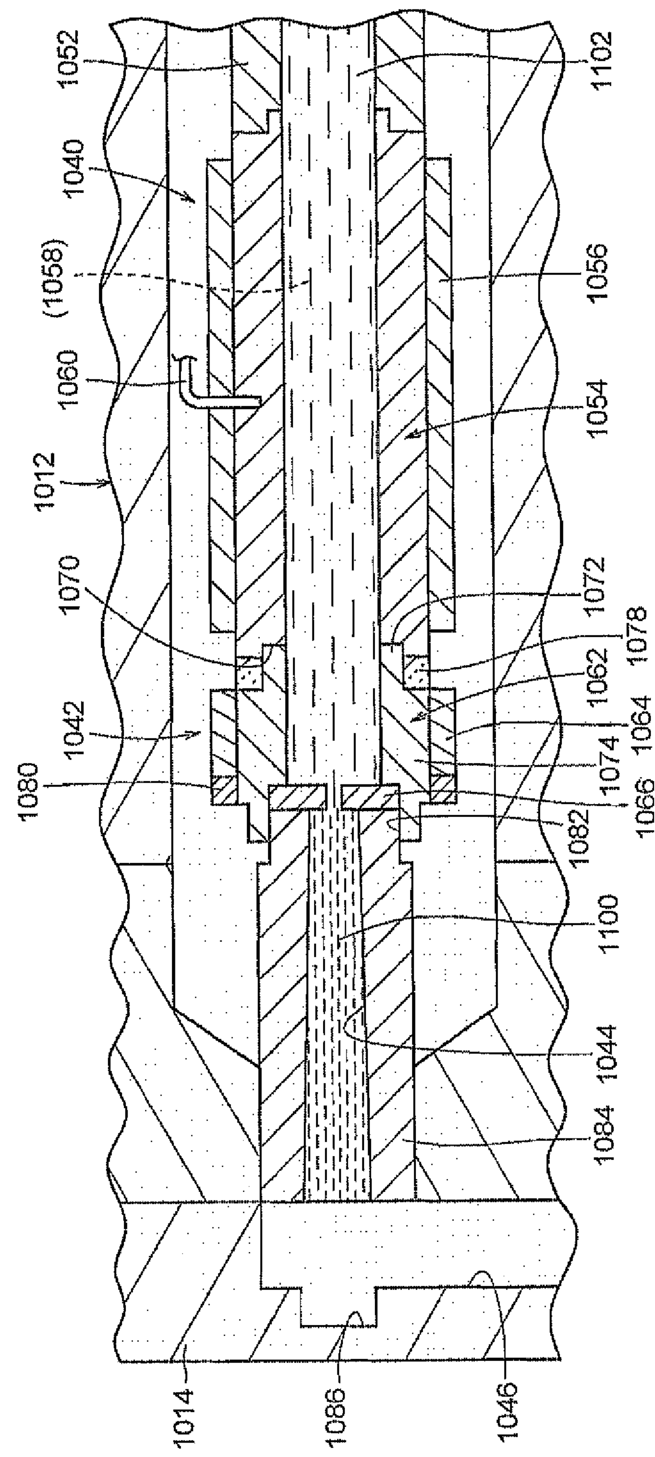
FIG. 6 is a schematic longitudinal sectional view of relevant parts showing a state that molten resin remained in a temperature rising part is pushed out from a temperature rising part by newly injected molten resin.

After performing the above injection molding, as shown in FIG. 5, the molten resin may remain in the temperature rising part 1040. The remained molten resin is, as shown in FIG. 6, pushed out to the spool 1044 by newly injected molted resin that passes through the second hot runner 1020 and branch path 1037, and reaches the temperature rising part 1040 in the next injection molding. To clearly discriminate between the remained molten resin and the newly injected molten resin, the former is designated by a reference numeral 1100, the latter is designated by a reference numeral 1102, and they are marked by different hatching.

Figure 7:
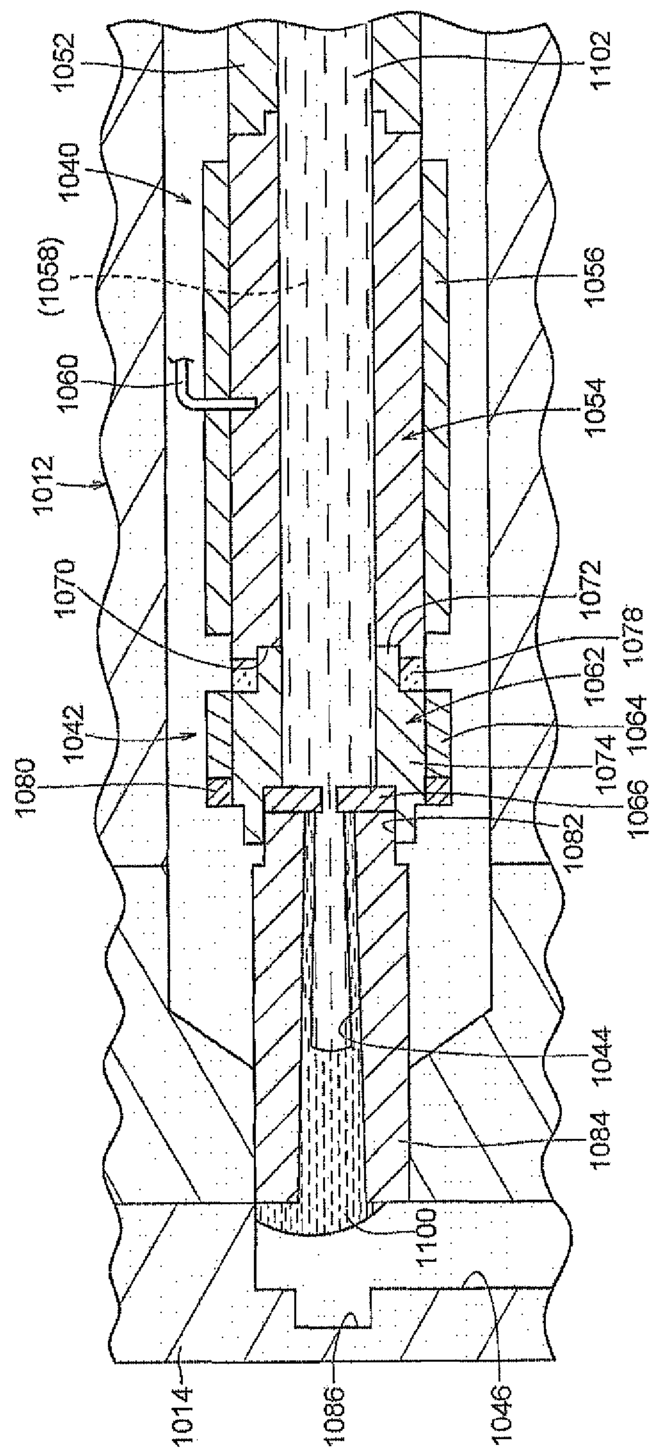
FIG. 7 is a schematic longitudinal sectional view of relevant parts showing a state that molten resin remained in a temperature rising part is further pushed out from the state of FIG. 6.
Figure 8:
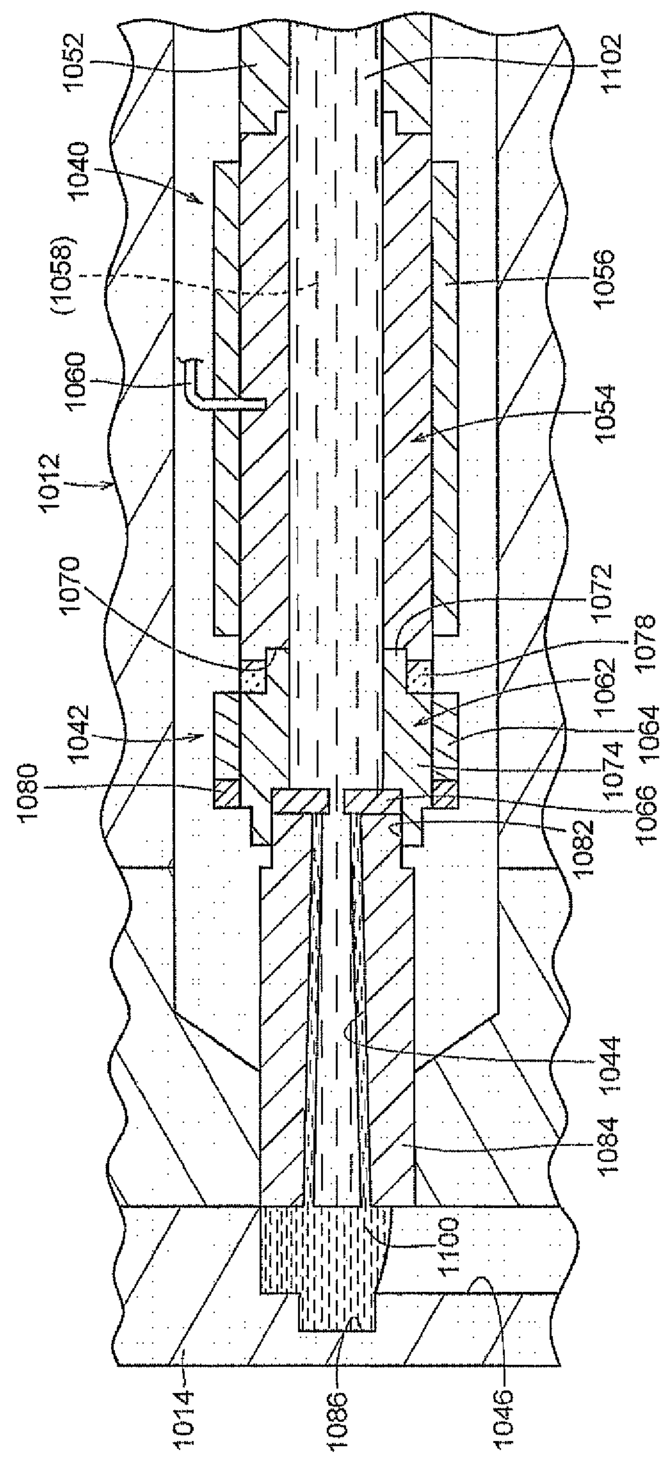
FIG. 8 is a schematic longitudinal sectional view of relevant parts showing a state that molten resin remained in a temperature rising part is further pushed out from the state of FIG. 7, and stored in a slag well.
Figure 9:
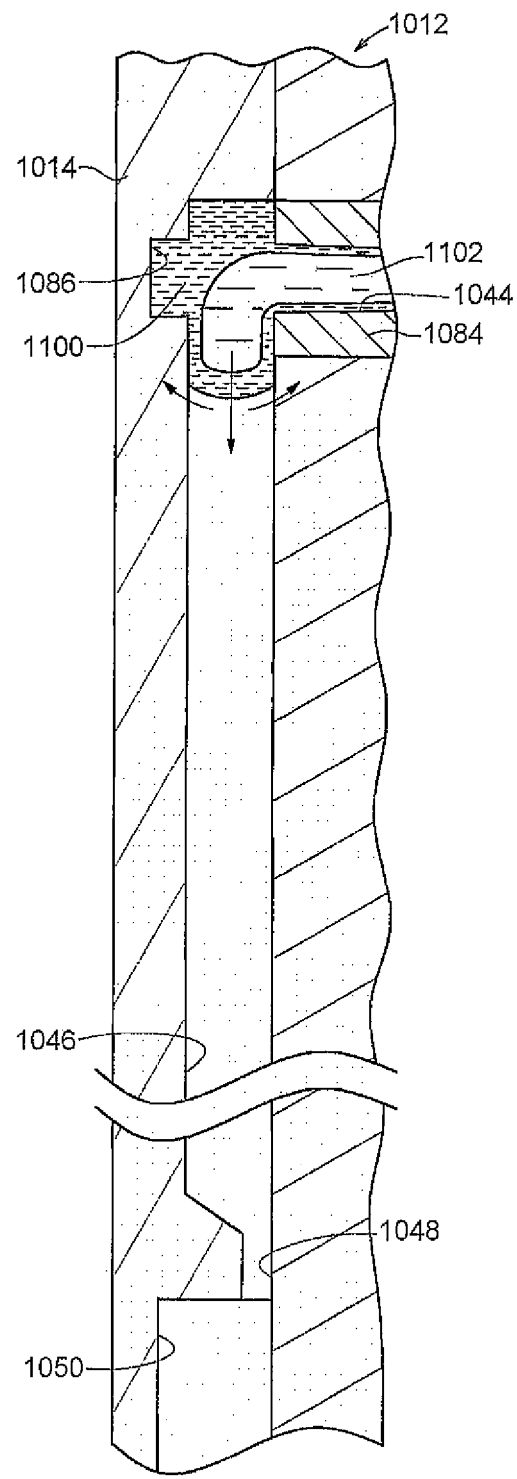
FIG. 9 is a schematic longitudinal sectional view of relevant parts showing a state that a part of remained molten resin stored in a slag well is pushed out from a slag well, and led to a runner.
Figure 10:
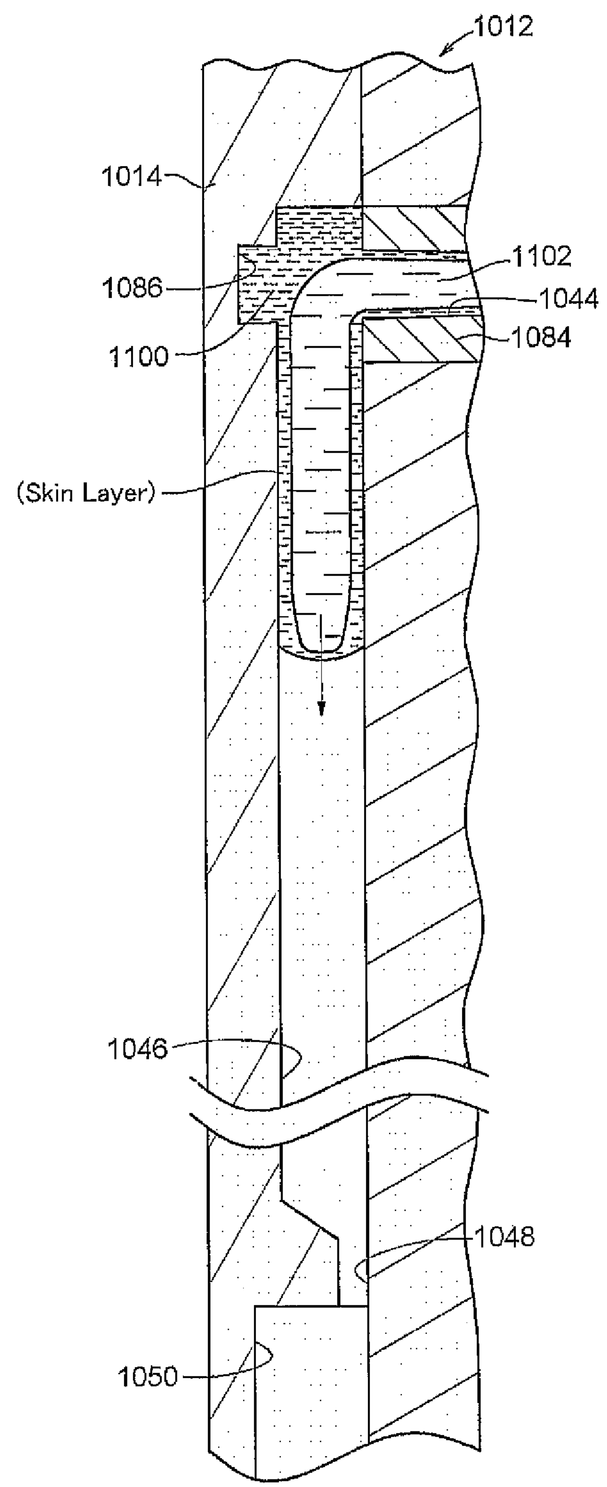
FIG. 10 is a schematic longitudinal sectional view of relevant parts showing a state that a part of remained molten resin is further pushed out from the state of FIG. 9, and flows in a runner.
Figure 11:
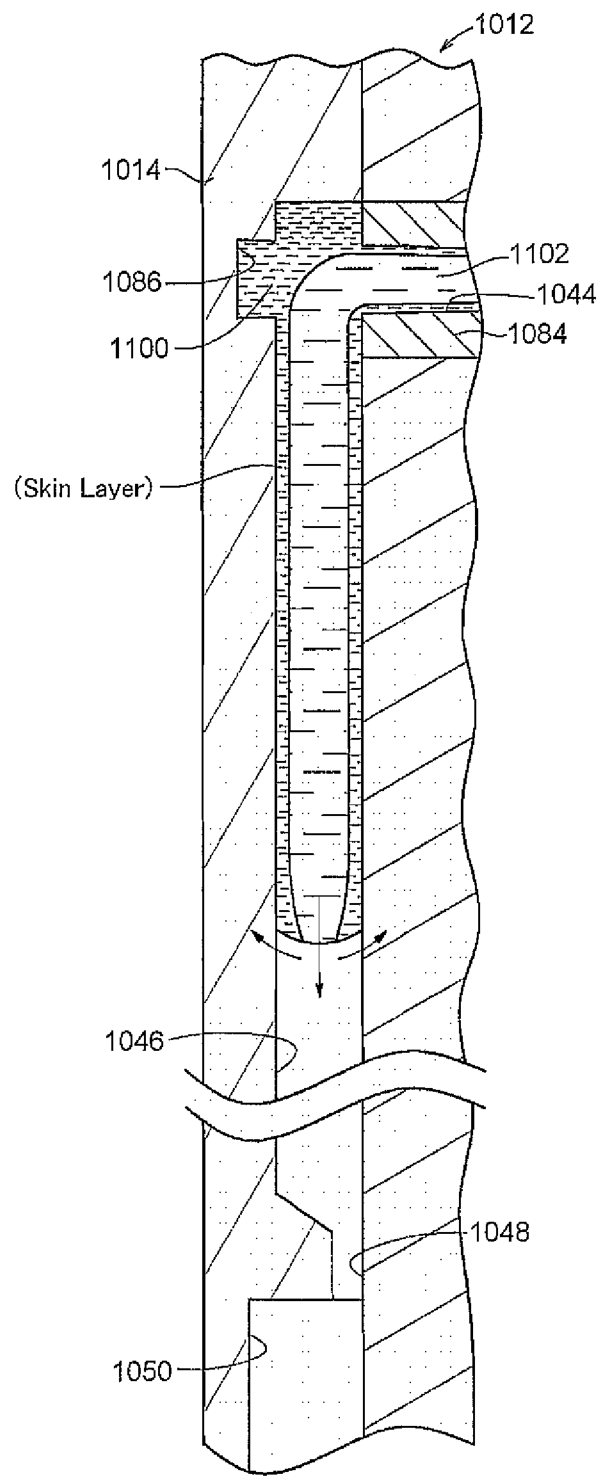
FIG. 11 is a schematic longitudinal sectional view of relevant parts showing a state that a part of remained molten resin is further pushed out from the state of FIG. 10, and flows in a runner.

The remained molten resin 1100 is partially adhered to the inner circumferential wall of the spool 1044 by a fountain flow described later. On the other hand, the other is pushed out toward the runner 1046 as shown in FIG. 7, and is stored in the slag well 1086 and runner 1046 as a result, as shown in FIG. 8. In other words, the slag well 1086 receives the pushed-out remained molten resin 1100.

The newly injected molten resin 1102 flows further while pressing a part near the center of the remained molten resin 1100, as shown in FIG. 9 to FIG. 12. In other words, a flow (a fountain flow) from the center to the wall surface of the runner 1046 occurs in the remained molten resin 1100.

Figure 12:
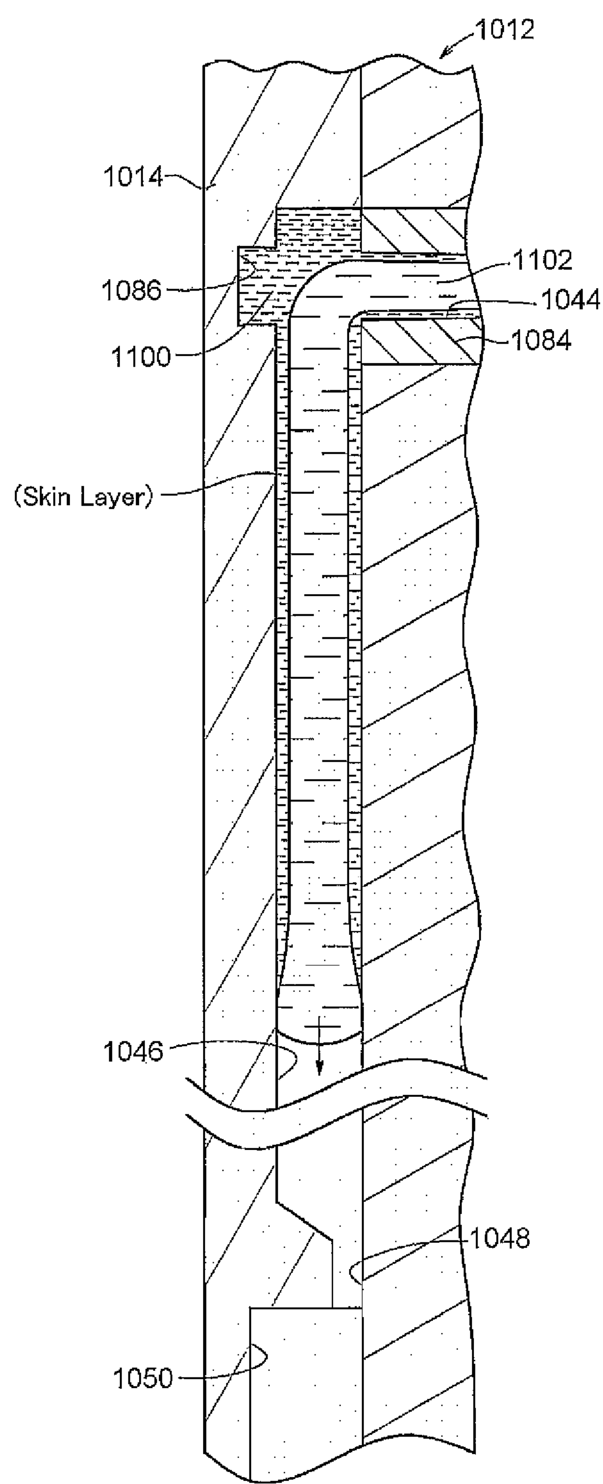
FIG. 12 is a schematic longitudinal sectional view of relevant parts showing a state that a part of remained molten resin forms a skin layer and remains after being further pushed out from the state of FIG. 11, and flows in a runner.
Figure 13:
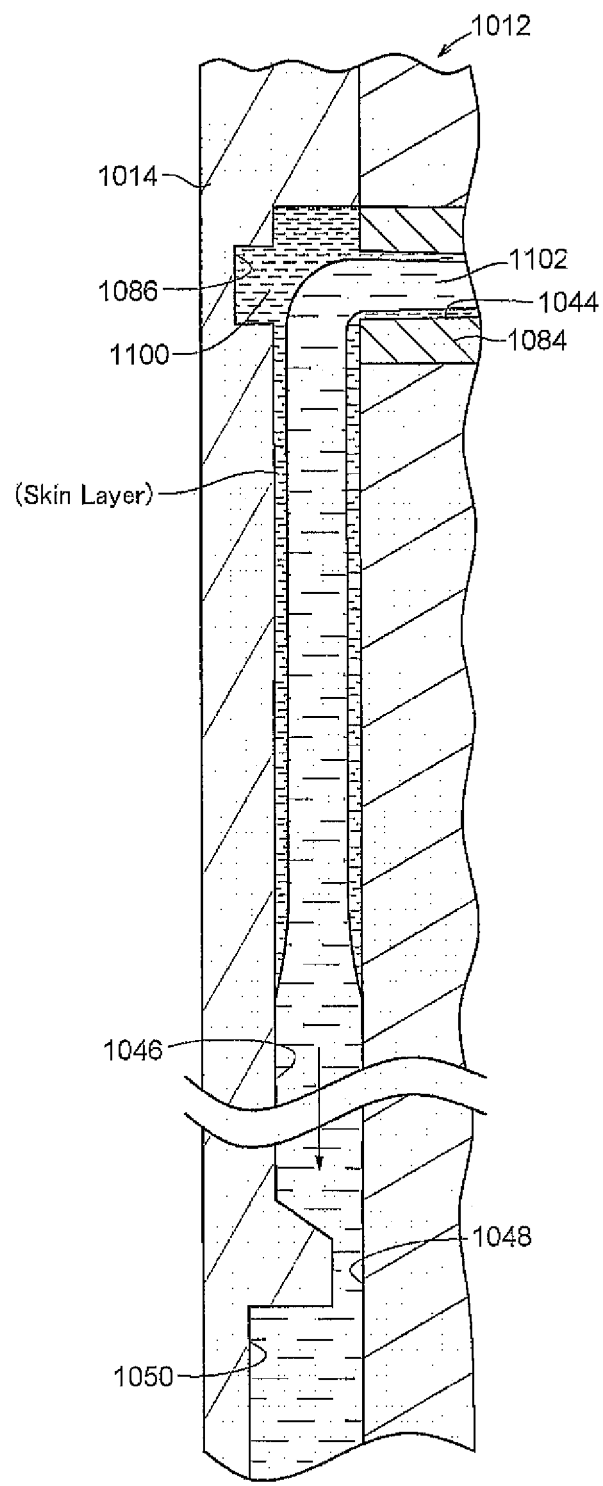
FIG. 13 is a schematic longitudinal sectional view of relevant parts showing a state that only newly injected molten resin is led to a product part.

The remained molten resin 1100 is pressed to the wall surface of the runner 1046 by the fountain flow, and the heat of the molten resin is removed by the wall surface. Thus, the remained molten resin 1100 near the wall surface is cooled and cured, and is adhered to the wall surface as a skin layer. As the total sum of the volume of the slag well 1086, the spool 1044, the runner 1046, and the gate 1048 is set higher than the volume of the static mixer 1054, formation of a skin layer is completed in the gate 1048 even at a maximum. FIG. 12 shows the case where adhesion of the remained molten resin 1100 to the wall surface is completed in the upstream side of the gate 1048. Thus, as seen from FIG. 13, the remained molten resin 1100 is prevented from being led to the product part 1050 in the next injection molding.

The remained molten resin 1100 has been stored in the high-temperature temperature rising part 1040 before the next injection molding is started after the last injection molding is finished. Thus, when the remained molten resin 1100 is led to the product part 1050, there is a possibility of producing a molded product with an insufficient strength. However, in the embodiment, the remained molten resin 1100 is temporarily received by the slag well 1086, and when the new molten resin 1102 flows, a fountain flow is generated to adhere the molten resin to the wall surfaces of the spool 1044 and runner 1046 as a skin layer. Thus, the remained molten resin 1100 is prevented from being led to the product part 1050. This eliminates the possibility of producing a molded product with an insufficient strength.

The skin layer is integrated with a cured product produced when the new molten resin 1102 remained in the runner 1046 is cooled and cured. As describe above, after the mold is opened, the cured product is cut off from the product part of the molded product.

Figure 14:
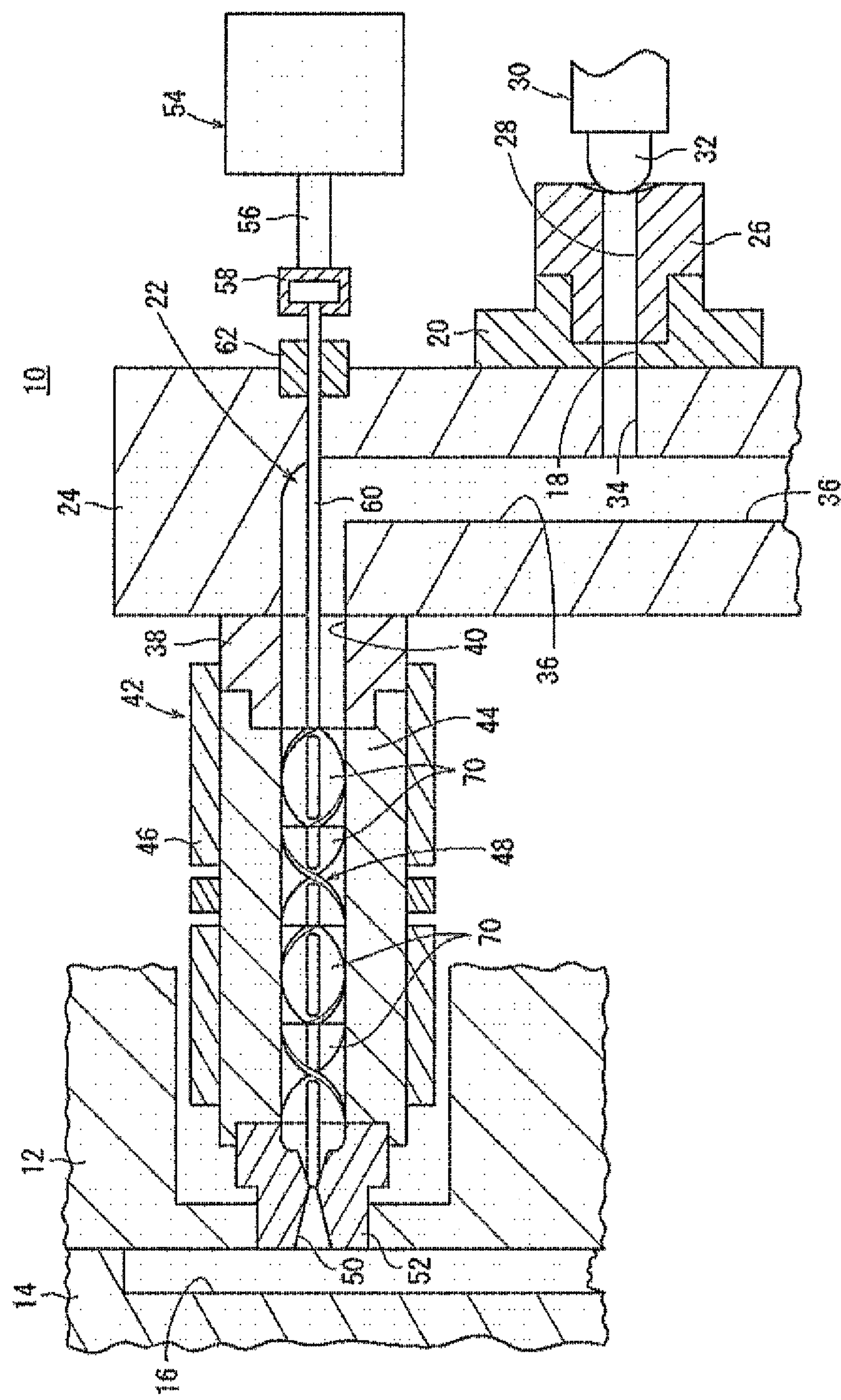
FIG. 14 is a schematic longitudinal sectional view of relevant parts of an injection molding apparatus according to a second embodiment.

FIG. 14 is a schematic longitudinal sectional view of relevant parts of an injection molding apparatus 10 according to a second embodiment. The injection molding apparatus 10 comprises a fixed mold 12, and a movable mold 14 that moves close to or apart from the fixed mold 12 under the action of a not-shown displacement mechanism. The fixed mold 12 and movable mold 14 form a cavity including a runner 16.

The fixed mold 12 is additionally provided with a hot runner block 20 in which a first hot runner 1016 is formed. On the downstream side of the hot runner block 20, a second hot runner manifold 24 in which a second hot runner 22 is formed is provided.

A touch piece 26 is provided in the hot runner block 20. A lead hole 28 is formed passing through the touch piece 26. An injection nozzle 32 of an injector 30 is seated on an opening of the lead hole 28.

The first hot runner 18 communicates with the lead hole 28. The second hot runner 22 comprises a guide path 34 communicating with the first hot runner 18, and a plurality of branch paths 36 branching radially from the guide path 34. FIG. 14 shows two out of the branch paths 36 spaced 180° each other.

The second hot runner 22 further comprises a communication path 40 provided in the hot nozzle 38, and a temperature rising part 42 as an end portion. Namely, the branch path 36 communicates with the temperature rising part 42 through the communication path 40. In other words, the communication path 40 is an upstream side flowing path of the temperature rising part 42.

In the vicinity of the first hot runner 18, the branch path 36, and the communication path 40, a not-shown heating unit such as a heater is provided. Therefore, molten resin flowing in the first hot runner 18, the branch path 36, and the communication path 40 is kept at a predetermined temperature between 200° C. and 220° C., for example.

In the second embodiment, the temperature rising part 42 is configured by winding a band heater 46 around an outer circumferential wall of a static mixer 44. An inside wall of an end portion of the static mixer 44 facing the hot nozzle 38 is threaded. The threaded portion is engaged with a threaded portion provided on an outside wall of an end portion of the hot nozzle 38 facing the static mixer 44.

The static mixer 44 is, as well known, a tubular member provided with a mixing blade 48 inside. Molten resin flowing in the static mixer 44 moves along a shape of the mixing blade 48 when passing through the mixing blade 48. While moving, the molten resin is stirred. As seen from this fact, the static mixer 44 is a stirring unit not requiring power.

The band heater 46 wound around the outer circumferential wall of the static mixer 44 transfers heat to the mixing blade 48 through the outer circumferential wall. Therefore, the heat is transferred also to the molten resin flowing in the mixing blade 48. Shearing heat is generated depending on a shape of the mixing blade 48. Therefore, a temperature of the molten resin is increased. In other words, the temperature rising part 42 is configured to raise the temperature of the molten resin flowing in the heat rising part 42. A temperature of the band heater 46, consequently, a temperature of the temperature rising part 42 is controlled depending on a value measured through a not-shown thermocouple.

In the downstream side of the static mixer 44, a nozzle tip 52 provided with a spool 50 is disposed. Molten resin passing through the temperature rising part 42 is led to the runner 16 as a part of a cavity via the spool 50. In other words, the spool 50 is a downstream side flowing path of the temperature rising part 42. The diameter of the spool 50 is gradually increased as if tapered from an end portion of the side (the upstream side) close to the temperature rising part 42 toward an end portion of the side (the downstream side) close to the movable mold 14.

In the above configuration, the hot runner block 20 or the hot runner manifold 24 is provided with a hydraulic cylinder (a displacement mechanism) that constitutes a path opening/closing part. In other words, the hydraulic cylinder 54 is supported by the fixed mold 12 via the hot runner block 20 or the hot runner manifold 24. Otherwise, the hydraulic cylinder 54 may be directly provided in the fixed mold 12.

A valve shaft 60 (a valve member) that constitutes the path opening/closing part together with the hydraulic cylinder 54 is connected to a front end of a piston rod 56 of the hydraulic cylinder 54 via a coupling 58. The valve shaft 60 is supported by a bearing 62 provided in the hot runner manifold 24, and is inserted into the branch path 36. The valve shaft 60 extends beyond a communication path 40 of the hot nozzle 38 and the temperature rising part 42.

On the other hand, the mixing blade 48 is provided with a plurality of insertion holes along a central axis of the static mixer 44. The valve shaft 60 is inserted into all insertion holes, and is entered into the inside of the nozzle tip 52.

In the spool 50, the size of the opening on the side facing the temperature rising part 42 is substantially equal to the size of the front end portion of the valve shaft 60. Thus, the front end of the valve shaft 60 can close the opening. Of course, when the valve shaft 60 is retreated rightward in FIG. 14, the opening is opened (refer to FIG. 15). In other words, the inside wall near the opening functions as a valve seat.

The movable mold 14 is provided with the runner 16 constituting a part of the cavity and a not-shown gate. A product part to obtain a molded product is provided in the downstream of the gate. In other words, the spool 50 communicates with the product part via the runner 16 and the gate.

The axial direction of the runner 16 is substantially orthogonal to the axial direction of the spool 50. Thus, the flowing direction of the molten resin led out from the spool 50 is changed by the runner 16.

Figure 15:
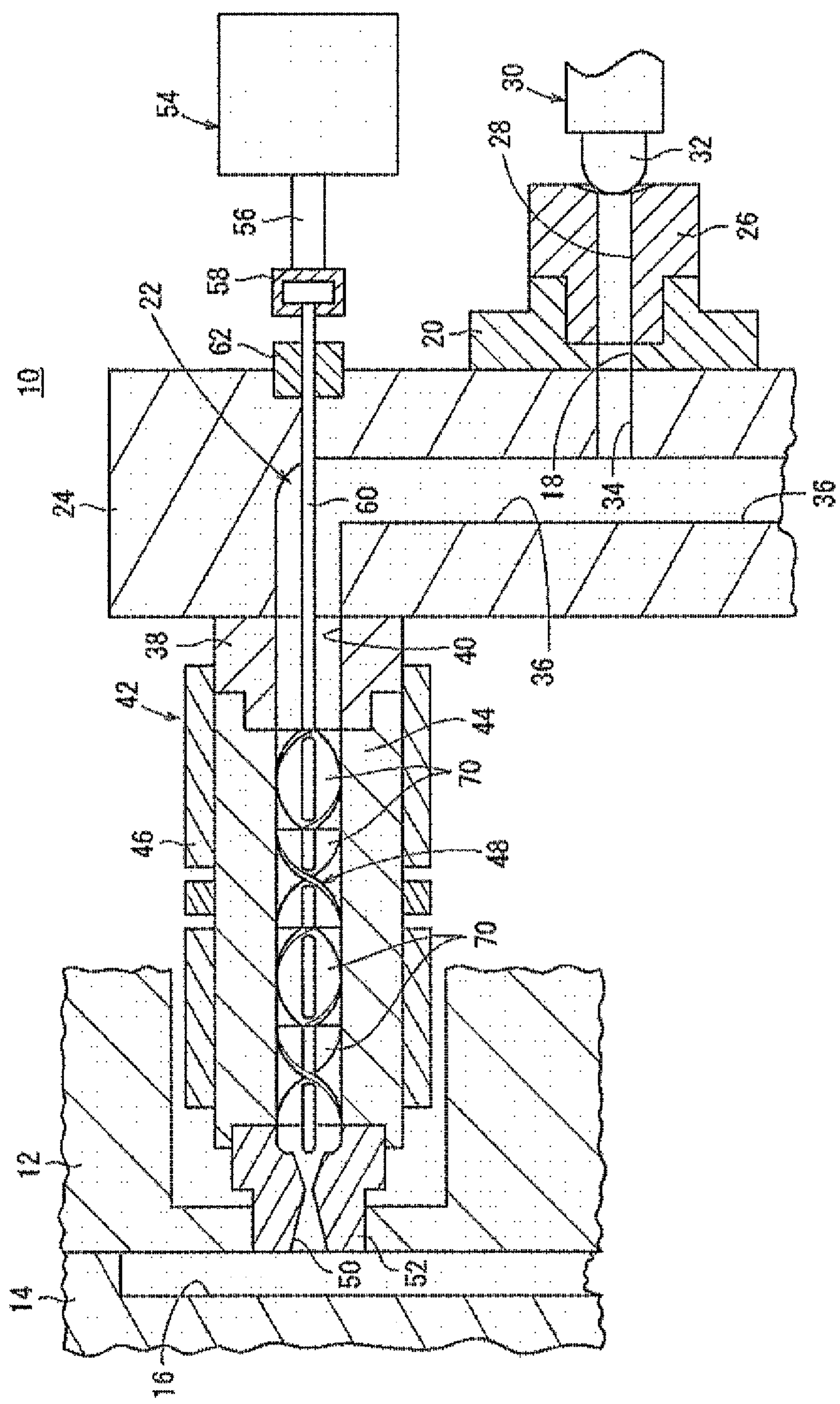
FIG. 15 is a schematic longitudinal sectional view of relevant parts showing a state that a path opening/closing part shown in FIG. 14 opens an opening of an inlet side of a spool.

In FIG. 14 and FIG. 15, the temperature rising part 42, spool 50, and runner 16 are magnified to facilitate understanding. The scales in FIG. 14 and FIG. 15 do not correspond to actual dimensions. For example, the axial dimension (length) of the static mixer 44 is actually set to be extremely smaller than that of the first hot runner 18 and branch path 36. Of course, this is the same for the length dimension of the valve shaft 60. In other words, the flowing distance of molten resin in the static mixer 44 is shorter than the flowing distances of molten resin in the first hot runner 18 and branch path 36. Therefore, the amount of molten resin remained inside the temperature rising part 42 is small.

The injection molding apparatus 10 according to the embodiment is basically configured as described above. Next, the function and effect will be explained in relation to an injection molding method implemented in the injection molding apparatus 10.

For injection molding, first, the movable mold 14 is displaced toward the fixed mold 12 under the action of the not-shown displacement mechanism, and the molds are clamped. Before or after that, resin is molten at a predetermined temperature in the injector 30 to obtain molten resin.

Next, by biasing the hydraulic cylinder 54 and retreating the piston rod 56, the valve member is moved back rightward, and the valve shaft 60 is separated from the inside wall (valve seat) near the opening as shown in FIG. 15. Then, the spool 50 is released, and the lead hole 28 communicates with the cavity via the first hot runner 18, second hot runner 22 (guide path 34, branch path 36, and temperature rising part 42), spool 50, and runner 16.

After communicating from the lead hole 28 to the cavity as described above, the molten resin is injected from the injection nozzle 32 of the injector 30. The injected molten resin reaches the first hot runner 18 through the lead hole 28 formed in the touch piece 26, and then reaches the branch path 36 through the guide path 34 of the second hot runner 22. The molten resin flows further along each of the branch paths 36.

As described above, the first hot runner 18 and second hot runner 22 are heated by a not-shown heating unit (a heater or the like). Thus, the molten resin flows in the first hot runner 18 and second hot runner 22 in being substantially kept at a melting temperature. Of course, this temperature can ensure a sufficient strength when the molten resin is cured by cooling to become a molded product.

A melting temperature or a holding temperature is set in accordance with a type of molten resin, generally between 200° C.-220° C., more preferably between 205° C.-215° C.

The molten resin flowing in the branch path 36 of the second hot runner 22 is led from the communication path 40 of the hot nozzle 38 to the inside of the static mixer 44 constituting the temperature rising part 42. Heat from the band heater 46 is transferred to the static mixer 44 so that the inside of the static mixer 44 is heated to be higher than a melting temperature in the injector 30. Further, when the molten resin passes through the mixing blade 48, shearing heat is generated. The heat is transferred to the molten resin passing through the mixing blade 48. As a result, the molten resin is heated to be higher than the melting temperature in the injector 30 or the temperature while flowing in the branch path 36, and the viscosity is lowered accordingly.

A setting temperature of the static mixer 44 is preferably 10° C.-150° C., more preferably 20° C.-100° C. higher than the melting temperature in the injector 30. Such temperatures can avoid production of a molded product with an insufficient strength.

The molten resin is heated by receiving a shearing force when passing through the mixing blade 48. In other words, the molten resin temperature is increased only by passing through the mixing blade 48. If the temperature increase is sufficient, the static mixer 44 may be set to the same temperature as the melting temperature in the injector 30.

The power consumption of the injection molding apparatus 10 can be reduced by setting the melting temperature in the injector 30 to a minimum value required to melt the resin, and setting the temperature of the temperature rising part 42 to a minimum value required to obtain the viscosity of molten resin required to fill in the entire product part.

In the embodiment provided with the static mixer 44, along with passing the molten resin through the mixing blade 48, the molten resin close to the inner circumference wall moves toward the diameter center, and the molten resin close to the diameter center moves toward the inner circumferential wall. Thus, the molten resin moved close to the band heater 46 as a heat source and heated to a relatively high temperature and the molten resin moved away from the band heater 46 and kept at a relatively low temperature are continuously mixed and flowed in the static mixer 44. Therefore, occurrence of temperature variations in the molten resin can be avoided. As a result, it is possible to obtain the molten resin with substantially the same temperature, or with substantially the uniform viscosity, in any part.

Moreover, even if a material for obtaining molten resin is a master batch material or metallic dyed material, it is sufficiently dispersed by stirring of the static mixer 44, and a molded product with excellent external appearance quality can be obtained. Further, after the first time injection molding, when second time injection molding is performed by changing a color and type, even if the molten resin injected in the first time injection molding remains and mixes with newly injected molten resin, both molten resins are sufficiently stirred by the static mixer 44, and an appearance defect like a stripe, for example, caused by the remained molten resin is difficult to occur in a molded product. Thus, the number of defective products can be decreased.

In addition, use of the static mixer 1054 does not require power for stirring. This avoids a complex configuration of the injection molding apparatus 10. At the same time, an increase of mold investment can be avoided, and power consumption is not increased.

The molten resin passed through the temperature rising part 42 passes through the spool 50, and is led to the product part via the runner 16 and a not-shown gate. As described above, the temperature of the molten resin led to the runner 16 is increased by the temperature rising part 42, and the viscosity is sufficiently lowered. Further, as the molten resin temperature is increased to be relatively high by the temperature rising, even if the heat of the molten resin is removed by the movable mold 14, the temperature is hard to decrease. Therefore, the molten resin flowing distance is increased, and even if there is a portion forming a thin wall portion in the product part, the molten resin easily passes through the portion, and reaches an end portion of the product part. In other words, the molten resin is densely filled in the entire cavity.

When a predetermined time elapses after the molten resin is injected, the hydraulic cylinder 54 is biased, and the piston rod 56 is moved forward to the right. Following the movement, the valve shaft 60 is also moved forward to the right, and the front end is attached to the inside wall (valve seat) near the opening. In other words, the spool 50 is closed.

The product part is usually adjusted to substantially a room temperature. Therefore, the heat of the molten resin led to the product part is removed. Further, as the spool 50 is closed, the molten resin filled in the cavity is isolated from the molten resin in the temperature rising part 42. Thus, the heat of the molten resin in the temperature rising part 42 is prevented from transferring to the molten resin filled in the cavity.

For the above reasons, the molten resin filled in the cavity is efficiently cooled and cured to become a molded product. In other words, according to the embodiment, it is possible to reduce the cycle time from starting injection of molten resin to obtaining a molded product.

Before being led to the temperature rising part 42, the molten resin is kept at a temperature capable of ensuring a sufficient strength when cooled and cured to become a molded product, and is flowed in the first hot runner 18, guide path 34, and branch path 36. Thereafter, the molten resin passes through the temperature rising part 42, but the flowing time is short. In other words, the time while the molten resin temperature is higher than the melting temperature in the injector is short. Thus, a change in physical properties of the molten resin can be avoided, and a molded product with a sufficient strength can be obtained. Moreover, as the molten resin has reached to the end portion of the product part and cured by cooling, occurrence of defects in the molded product can be avoided.

Further, it is unnecessary to increase a molten resin injection pressure, and it is unnecessary to increase a mold clamping pressure to avoid burrs. Therefore, a displacement mechanism (a hydraulic cylinder or the like) for clamping and opening a mold may be compact. This avoids an increase in the size and weight of the injection molding apparatus 10. Further, as an expensive displacement mechanism is unnecessary, an increase of capital investment can be avoided.

Moreover, in the embodiment, a multipoint gate is not used, and it is unnecessary to worry about occurrence of a weld line. In addition, it is only necessary to control a temperature of the temperature rising part 42, and it is unnecessary to repeat a test for setting injection conditions.

By opening a mold by separating the movable mold 14 from the fixed mold 12 under the action of the displacement mechanism, a molded product can be exposed. A molded product is pushed out by a knockout pin (not shown), for example, and separated from the injection molding apparatus 10.

A molded product is obtained as a piece that the resin remained and cured by cooling in the spool 50, runner 16, and gate is integrally connected to a product part. Such a portion is cut off from a product part of a molded product, and crushed for use as a starting material in the next injection molding.

The molten resin remained in the temperature rising part 42 is kept warm by the hand heater 46. Further, the remained molten resin is isolated from the molten resin filled in the cavity, and is prevented from heat loss by the molten resin filled in the cavity. Therefore, the molten resin remained in the temperature rising part 42 is maintained in a molten state, and is filled in the cavity in the same way when the next injection molding is performed.

Therefore, in the next injection molding, it is avoided that a cured piece of the molten resin remained in the temperature rising part 42 is mixed in a molded product as a foreign matter. Thus, a molded product with excellent appearance without defects can be obtained. Of course, occurrence of burrs can also be prevented as described above. In other words, the quality of a molded product is not affected by opening/closing of the spool 50 by the valve shaft 60.

As well known, the mixing blade 48 is formed by combined a plurality of stirring blades 70 by brazing. Each blade is combined at the center of radial direction. In other words, in the above embodiment, an insertion hole for passing the valve shaft 60 is formed in the joint part. In such a case, when a molten resin injection pressure is extremely high, the mixing blade 48 may be deformed.

Figure 16:
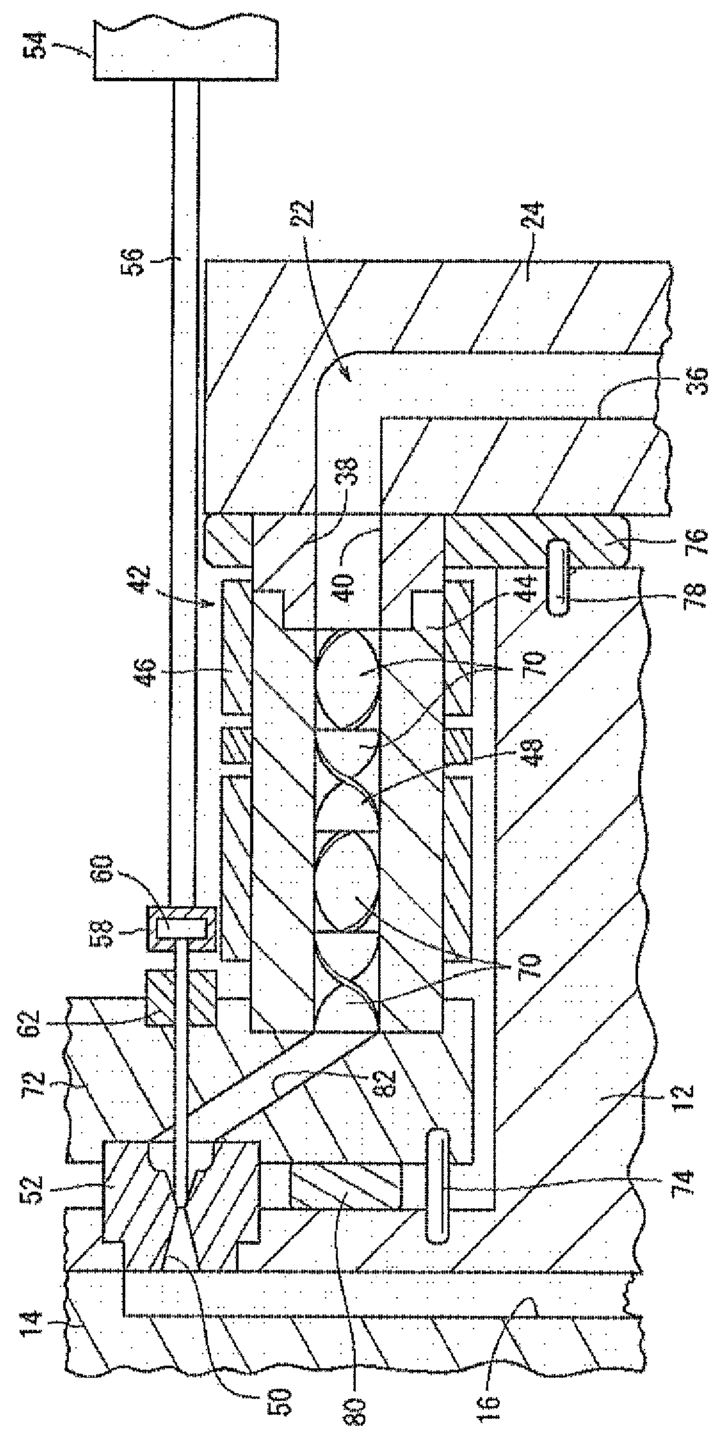
FIG. 16 is a schematic longitudinal sectional view of relevant parts of an injection molding apparatus in which a valve member constituting a path opening/closing part is provided without passing through a stirring part.

When there is such a possibility, for example, a bypass block 72 is provided between the temperature rising part 42 and the nozzle tip 52, as shown in FIG. 16. The bypass block 72 may be supported by the fixed mold 12 via a positioning pin 74. In FIG. 16, reference numerals 76, 78 and 80 denote a positioning ring, a position pin, and a support block, respectively. In this case, a bearing 62 is provided in the bypass block 72.

In the bypass block 72, a passageway 82 is formed as a communication path. A longitudinal direction of the passageway 82 obliquely crosses a longitudinal direction of the static mixer 44 at a predetermined angle. On the other hand, the valve shaft 60 extends parallel to the longitudinal direction of the static mixer 44. In other words, the valve shaft 60 and static mixer 44 are placed in parallel to each other.

In this case, although the temperature rising part 42 is separated from the spool 50, as the passageway 82 is formed between them, the temperature rising part 42 communicates with the spool 50 via the passageway 82. Thus, the molten resin can be filled in the cavity in the same way as described above.

Figure 17:
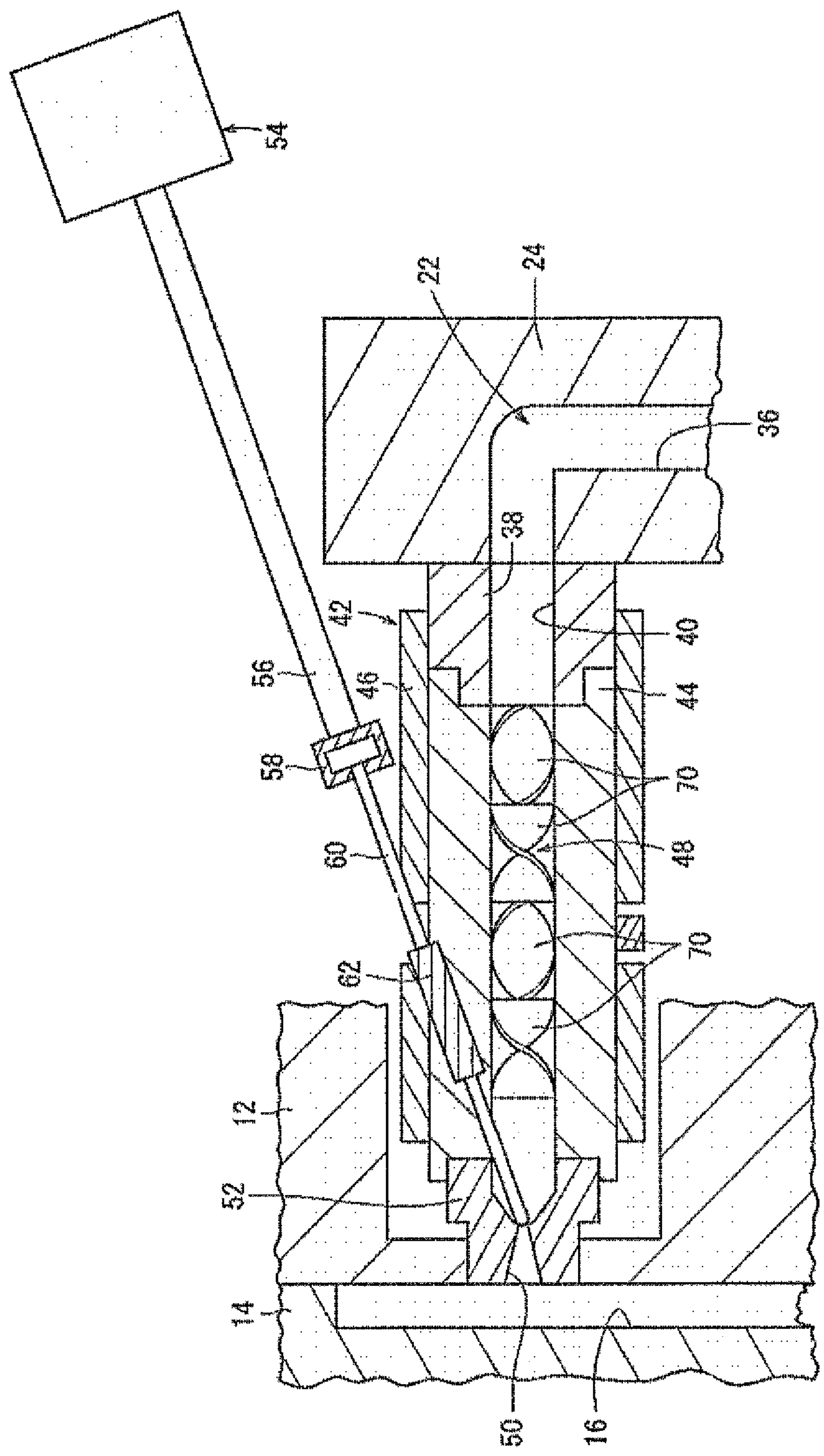
FIG. 17 is a schematic longitudinal sectional view of relevant parts of an injection molding apparatus in which a valve member constituting a path opening/closing part is provided so as to be inclined to a longitudinal direction of a stirring part.

Otherwise, as shown in FIG. 17, the valve shaft 60 may be extended in a direction inclined to the longitudinal direction of the static mixer 44. In this case, the bearing 2 can be provided on the outside wall of the static mixer 44, for example. In this case, as shown in FIG. 18 and FIG. 19, the inside wall of the opening of the inlet side of the spool 50 may be shaped to permit to seat on and separate from a front end of the obliquely extending valve shaft 60.

Figure 18:
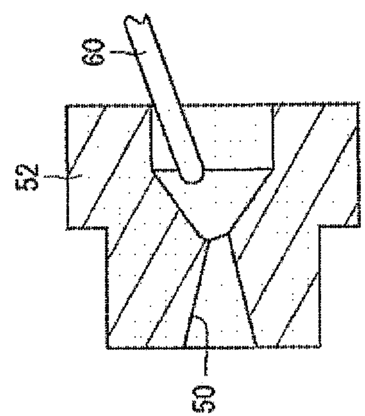
FIG. 18 is a magnified view of relevant parts showing a part near a tip of a valve member while the injection molding apparatus shown in FIG. 17 is in an opened state.
Figure 19:
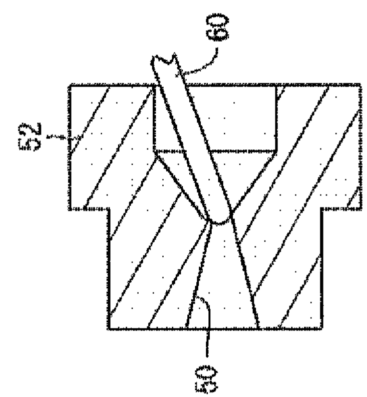
FIG. 19 is a magnified view of relevant parts showing a part near a tip of a valve member while the injection molding apparatus shown in FIG. 17 is in a closed state.
Figure 20:
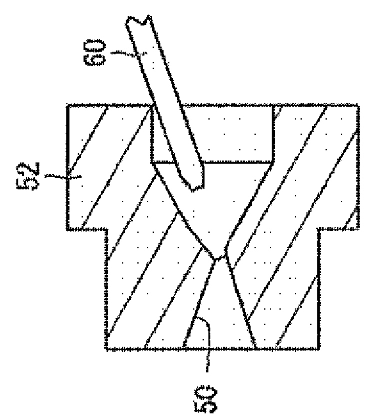
FIG. 20 is a magnified view of relevant parts showing an opened state when a shape of the tip of the valve member is different from those in FIG. 18 and FIG. 19.
Figure 21:
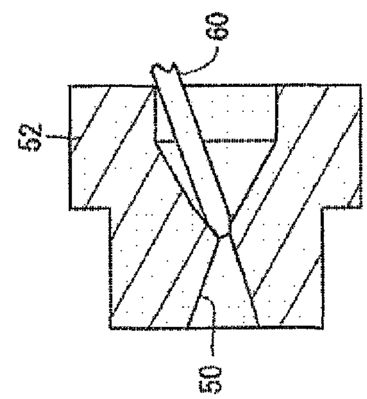
FIG. 21 is a magnified view of relevant parts showing a closed state when a shape of the tip of the valve member is different from those in FIG. 18 and FIG. 19.

FIG. 18 and FIG. 19 show the case where the front end of the valve shaft 60 is substantially hemispherical. However, as shown in FIG. 20 and FIG. 21, even when the front end is conic trapezoidal, the shape of the inside wall of the opening of the inlet side of the spool 50 may be matched to the shape of the front end of the valve shaft 60.

Figure 22:
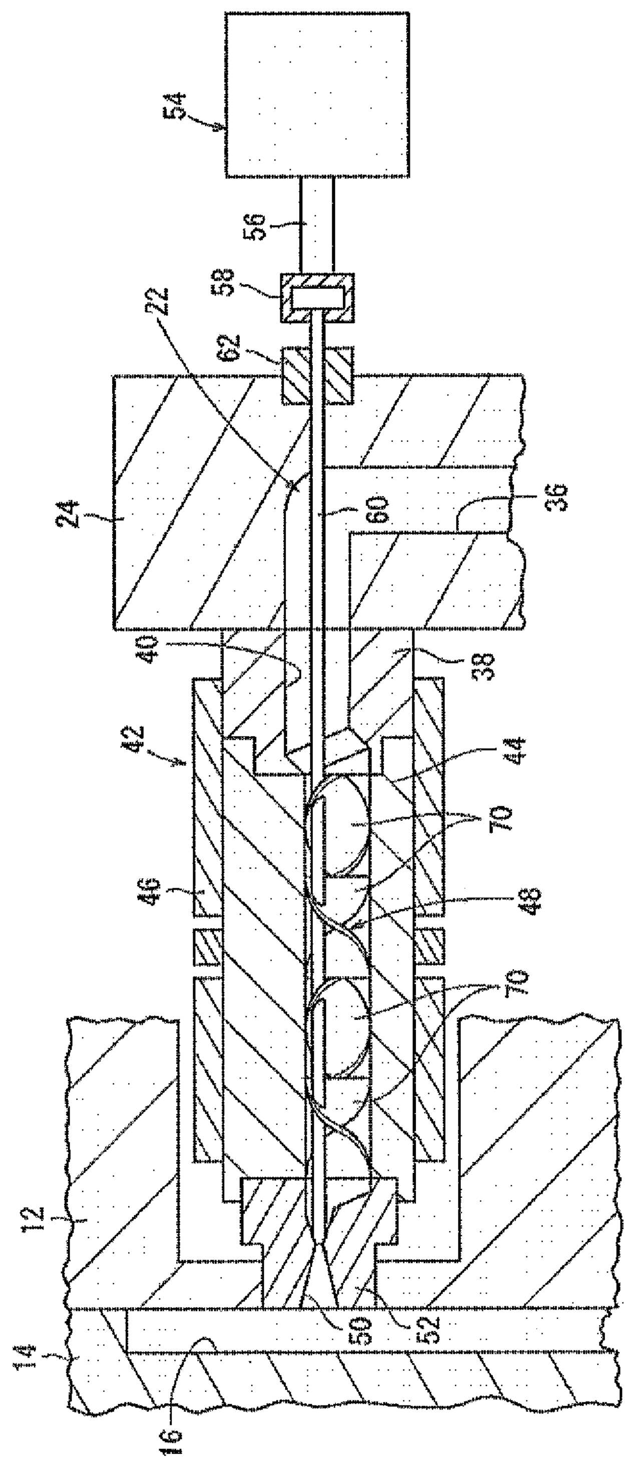
FIG. 22 is a schematic longitudinal sectional view of relevant parts of an injection molding apparatus in which a valve member is passed thorough avoiding a junction of stirring blades of a stirring part.
Figure 23:
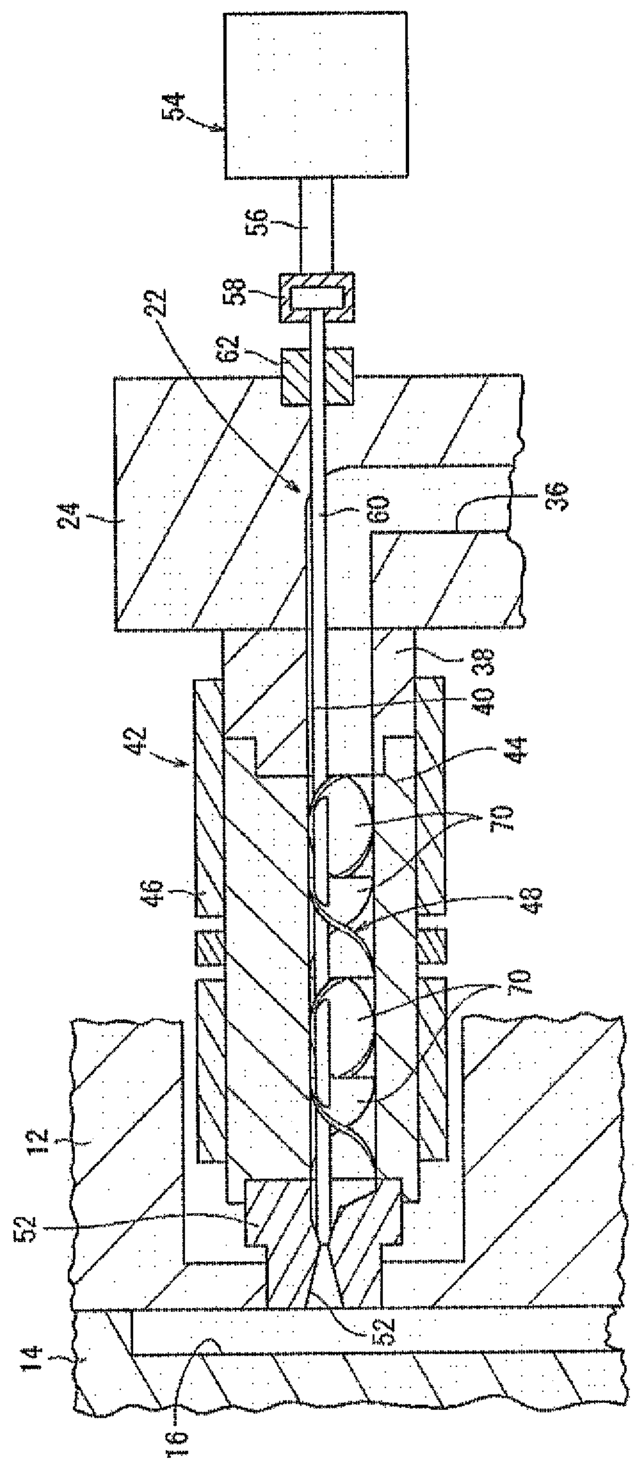
FIG. 23 is a schematic longitudinal sectional view of relevant parts of an injection molding apparatus having a configuration different from that shown in FIG. 9, in which a valve member is passed through avoiding a junction of stirring blades of a stirring part.

Further, as shown in FIG. 22, the insertion hole may be formed so as to avoid a junction of the stirring blades 70 (the center in the radial direction). In this case, the communication path 40 of the hot nozzle 38 may be inclined like a crank or a reducer, so that the axial center (diameter center) of the outlet of the communication path 40 aligns with axial center (diameter center) of the static mixer 44, and the axial center of the spool 50 may be provided at a position offset from the axial center of the static mixer 44. Otherwise, as shown in FIG. 23, the communication path 40 of the hot nozzle 38 may be provided at a position offset from the axial center of the hot nozzle 38.

By aligning the axial center of the outlet of the communication path 40 with the axial center of the temperature rising part 42 as descried above, the molten resin is prevented from staying between the communication path 40 and the temperature rising part 42.

The above embodiment explains with an example of providing a path opening/closing part in the fixed mold 12. A path opening/closing part may be provided in the movable mold 14.

Figure 24:
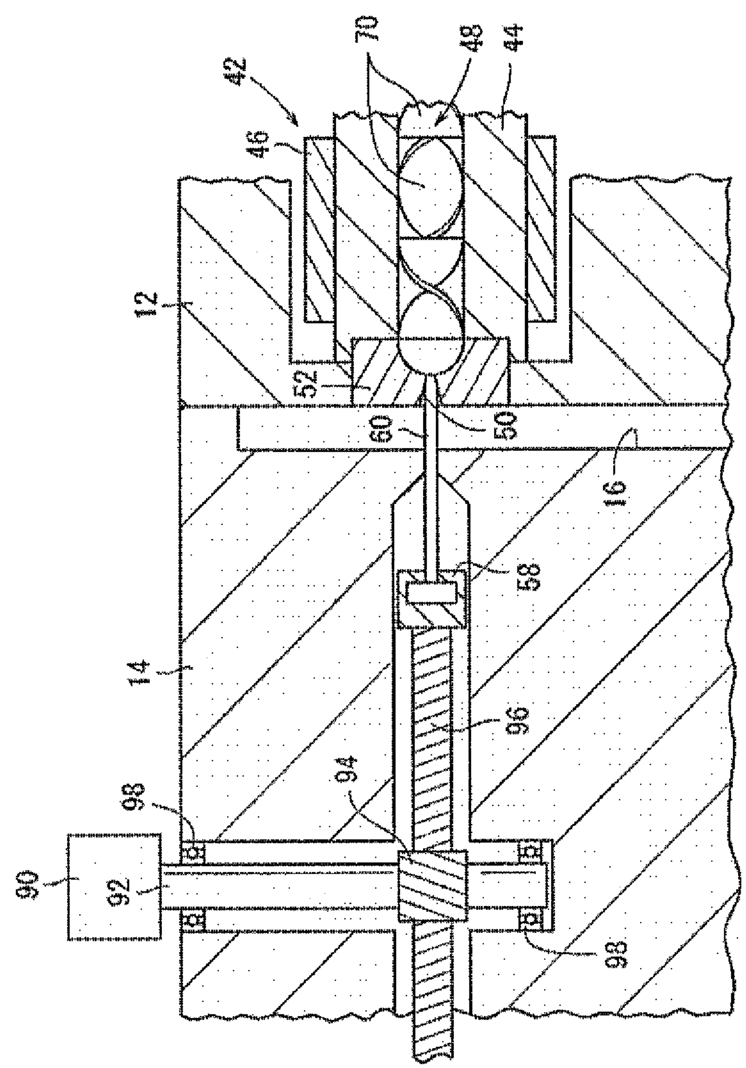
FIG. 24 is a schematic longitudinal sectional view of relevant parts of an injection molding apparatus in which a path opening/closing part is provided in a movable mold.

For example, in the embodiment shown in FIG. 24, the movable mold 14 is provided with a displacement mechanism comprising a motor 90, a rotation axis 92, a pinion gear 94, and a rack 96. A bearing 98 is interposed between the rotation axis 92 and the movable mold 14.

Figure 25:
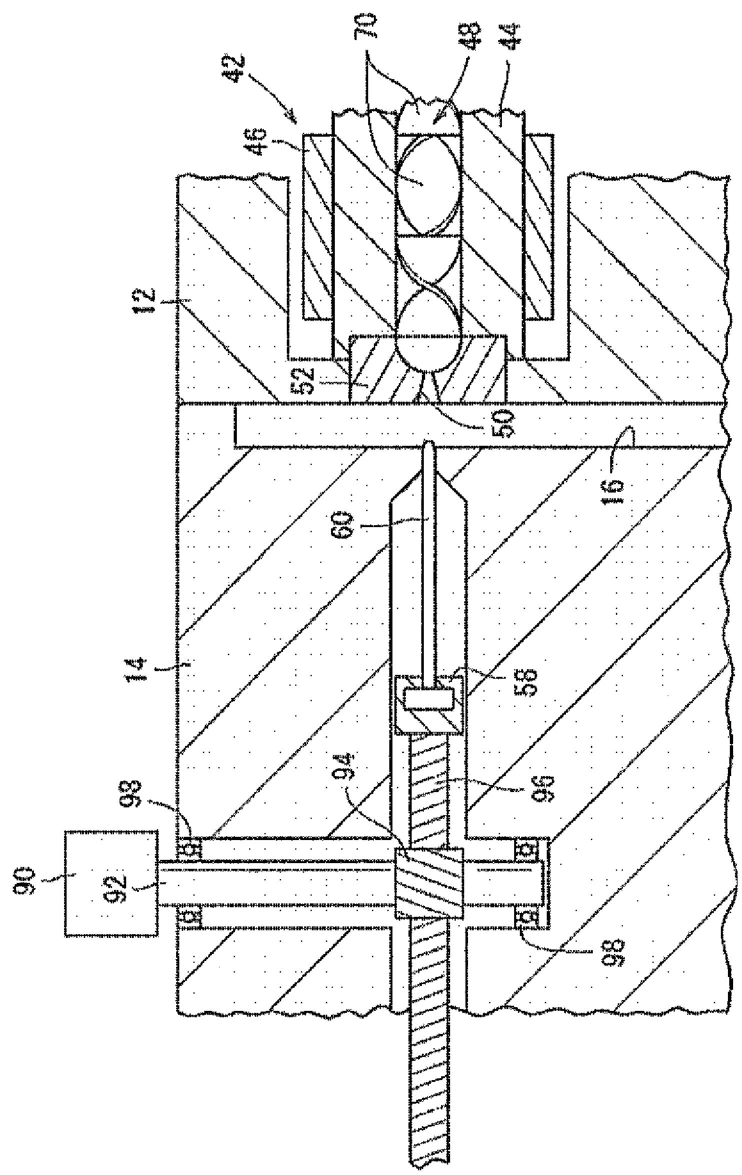
FIG. 25 is a schematic longitudinal sectional view of relevant parts showing a state that the path opening/closing part shown in FIG. 24 opens an opening of an inlet side of a spool.

The valve shaft 60 is connected to the front end of the rack 96 via a coupling 58. The front end of the valve shaft 60 is attached to or detached from the inside wall near the opening of the inlet side of the spool 50. In other words, when injection molding is performed, the motor 90 is biased, and thereby the rotation axis 92 starts rotation. Following this, when the pinion gear 94 provided in the rotation axis 92 rotates, the rack 96 engaged with the pinion gear 94 moves backward. As a result, as shown in FIG. 25, the valve shaft 60 is displaced leftward, and its front end is separated from the inside wall of the opening of the inlet side of the spool 50. Therefore, as described above, the part from the lead hole 28 to the cavity is continued.

In this state, molten resin is supplied. The molten resin passes through the temperature rising part 42, and is filled in a product part via the runner 16. When the filling is completed, the motor 90 is biased again, and the rack 96 is moved forward. Following this, the valve shaft 60 is displaced rightward, and its front end closes the opening of the inlet side of the spool 50 as in FIG. 24. Thereafter, the molten resin is cooled and cured, and a molded product can be obtained in a state that the valve shaft 60 has entered.

After obtaining a molded product in such a manner, a mold is opened. At this time, the molded product is supported by the retreated valve shaft 60. This eliminates a possibility that the molded product drops off from a mold. At this time, the molded product is being fixed to the movable mold 14.

After the mold is opened, a not-shown ejector pin works, pushes out the molded product, and separates it from the movable mold 14. The motor 90 is biased again if necessary, and the valve shaft 60 is displaced rightward. In other words, the molded product is kept in being supported by the valve shaft 60, and prevented from falling off.

After the molded product is removed from the valve shaft 60, the ejector pin and the valve shaft 60 are displaced leftward, and returned to the original positions. In the molded product, a portion where the valve shaft 60 has passed through becomes a through-hole, but this portion may be cut off including a surrounding part, and may be reused.

When there is no possibility of falling off the molded product, the molded product may be separated from the movable mold 14 by operating only the ejector pin without displacing the valve shaft 60 rightward. At this time, the valve shaft 60 may be returned to the original position by displacing leftward.

Figure 26:
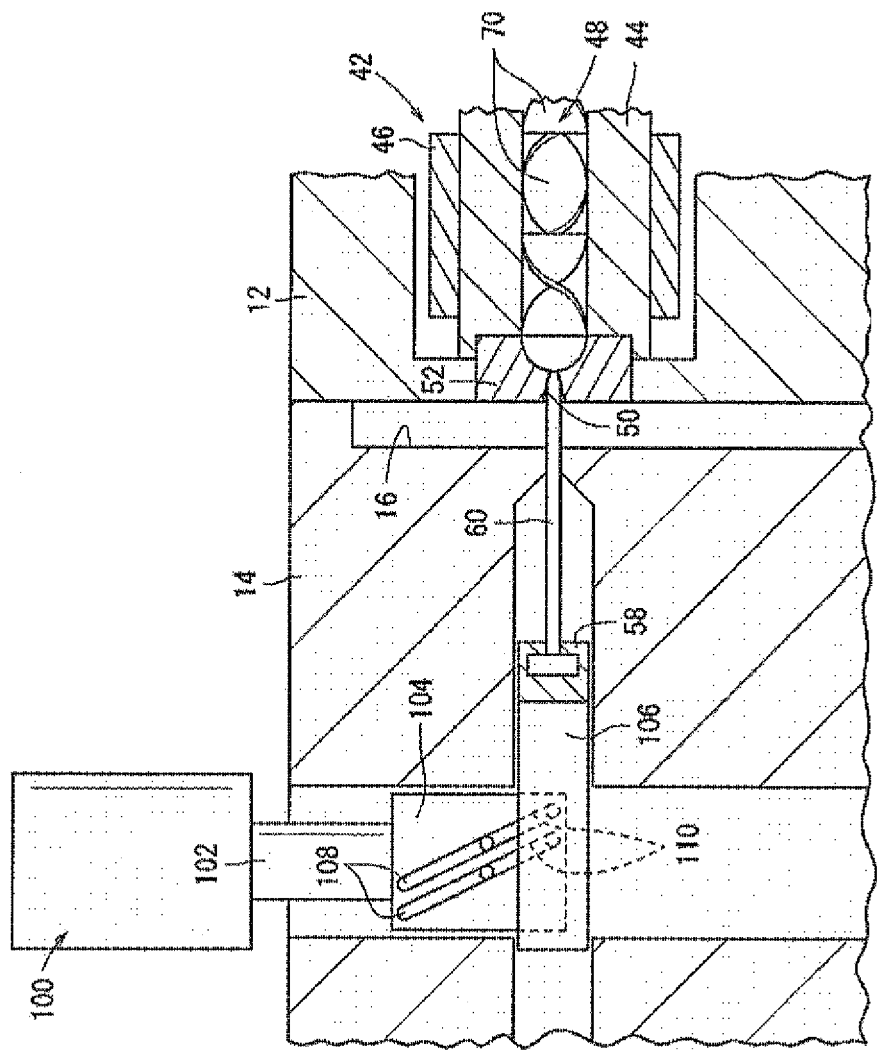
FIG. 26 is a schematic longitudinal sectional view of relevant parts of an injection molding apparatus having a configuration different from that shown in FIG. 24, in which a path opening/closing part is provided in a movable mold.

As shown in FIG. 26, the displacement mechanism may be configured to include a first cam member 104 and a second cam member 106 provided in a piston rod 102 of a hydraulic cylinder 100. In other words, the first cam member 104 is provided with a convex cam portion 108 extending in a direction inclined to the longitudinal direction of the piston rod 102, and the second cam member 106 is provided with a concave cam portion 110 engaging with the convex cam portion 108. Of course, the convex cam portion 108 slidably engages with the concave cam portion 110.

Figure 27:
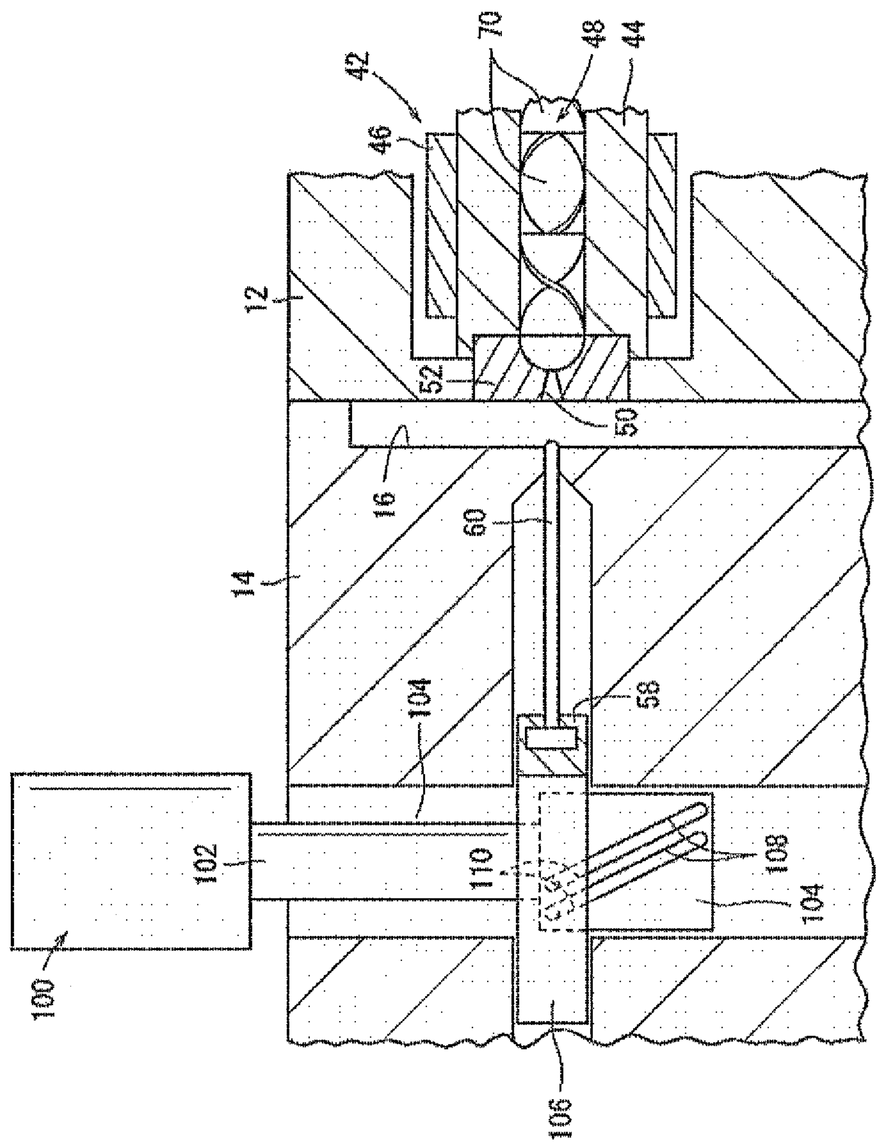
FIG. 27 is a schematic longitudinal sectional view of relevant parts showing a state that the path opening/closing part shown in FIG. 26 opens an opening of an inlet side of a spool.

In this case, the valve shaft 60 is connected to the second cam member 106 via the coupling 58 provided at the front end of the second cam member 106. The front end of the valve shaft 60 is, as described above, attached to or detached from the inside wall near the opening of the inlet side of the spool 50. In other words, when injection molding is performed, the hydraulic cylinder 100 is biased, and thereby the piston rod 102 is moved down. At this time, as the convex cam portion 108 is being slidably engaged with the concave cam portion 110, the second cam member 106 is displaced leftward. As a result, as shown in FIG. 27, the valve shaft 60 is displaced leftward, and its front end is separated from the inside wall near the opening of the inlet side of the spool 50. Therefore, as described above, the part from the lead hole 28 to the cavity is continued.

In this state, molten resin is supplied. The molten resin passes through the temperature rising part 42, and is filled in a product part through the runner 16. When the filling is completed, the hydraulic cylinder 100 is biased again. Thereby, the piston rod 102 is moved upward, and the second cam member 106 is displaced rightward under the actions of the convex cam portion 108 and the concave cam portion 110. Following this, the valve shaft 60 is displaced rightward, and its front end closes the opening of the inlet side of the spool 50 as in FIG. 26. Thereafter, the molten resin is cooled and cured, and a molded product can be obtained in a state that the valve shaft 60 has entered.

Thereafter, the same operations as those in the embodiment shown in FIG. 24 and FIG. 25 are performed. Namely, after the mold is opened, the molded product is pushed out and separated from the movable mold 14 under the action of the ejector pin. At this time, the hydraulic cylinder 100 is biased again if necessary, and the valve shaft 60 is displaced rightward. Of course, when there is no possibility of falling off the molded product, the molded product may be separated from the movable mold 14 by operating only the ejector pin without displacing the valve shaft 60 rightward. At this time, the valve shaft 60 may be returned to the original position by displacing leftward.

After the molded product is removed from the valve shaft 60, the ejector pin and the valve shaft 60 are displaced leftward, and returned to the original positions. A portion that the valve shaft 60 has passed through becomes a bottomed hole or a through-hole, but this portion may be cut off including a surrounding part.

Figure 28:
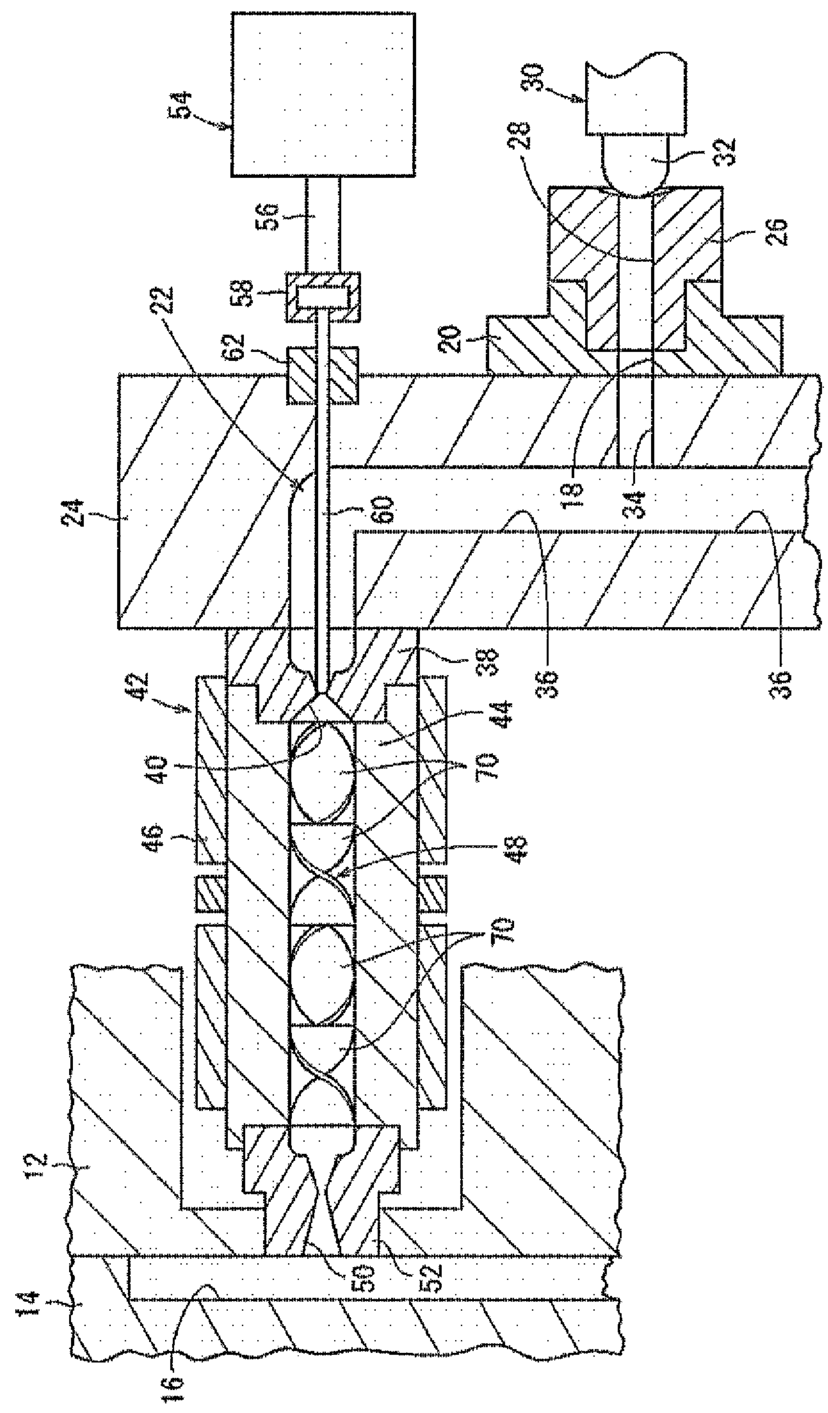
FIG. 28 is a schematic longitudinal sectional view of relevant parts of an injection molding apparatus capable of opening/closing a downstream side fluid path of a temperature rising part.

Apart from the above, as shown in FIG. 28, the communication path 40 that is a downstream side flowing path of the temperature rising part 42 may be opened or closed. In this case, the inlet opening (upstream side) facing the branch path 36 of the communication path 40 of the hot nozzle 38 is narrowed like a reducer. The valve shaft 60 is attached to or detached from the inside wall near the narrowed opening.

Figure 29:
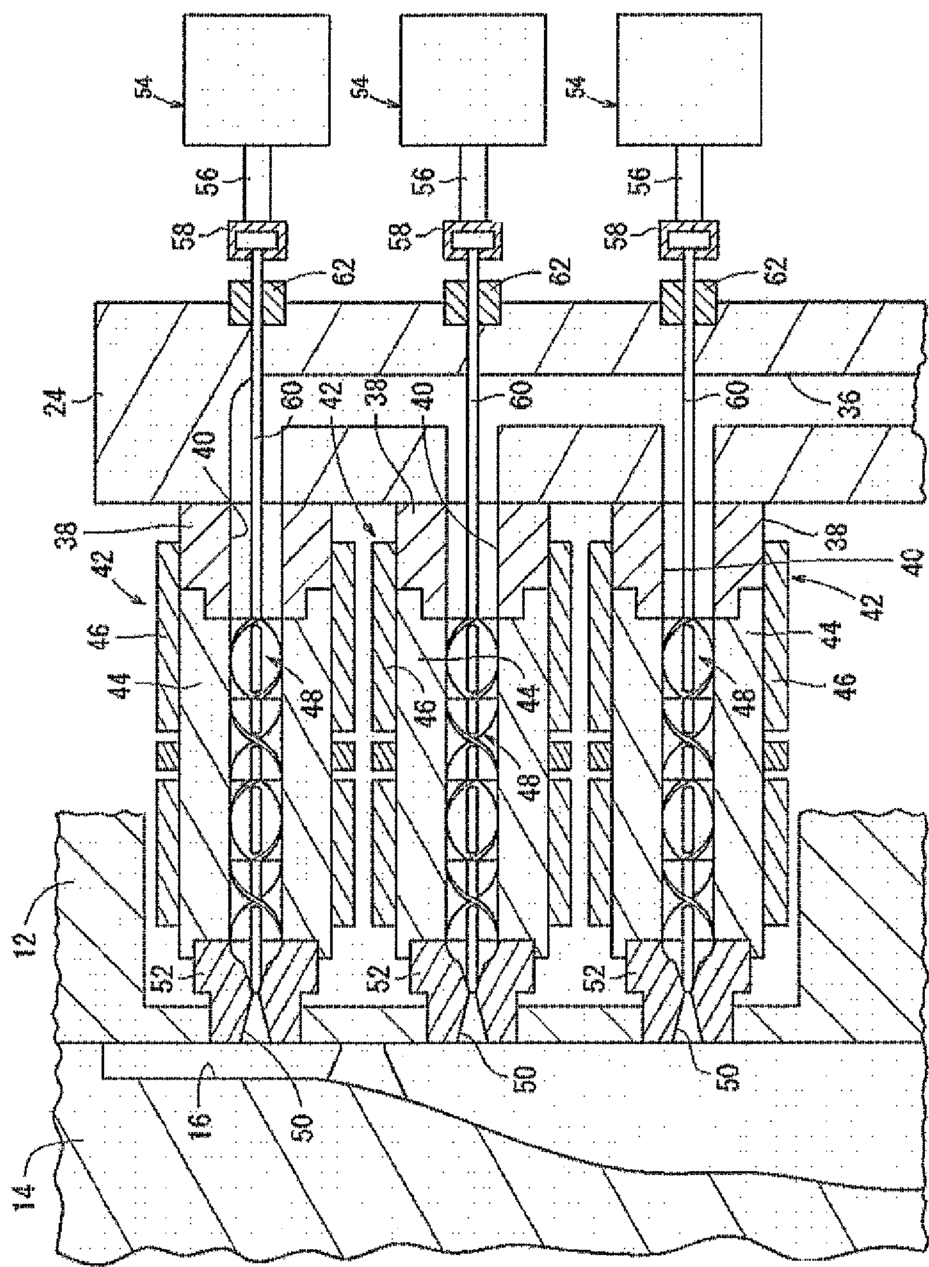
FIG. 29 is a schematic longitudinal sectional view of relevant parts of an injection molding apparatus provided with a plurality of temperature rising parts and path opening/closing parts.

Further, as shown in FIG. 29, it is permitted to provide more than one temperature rising part 42 and path opening/closing part. In this case, for example, when the runner 16 and product part are gradually expanded toward the product part located below, a sequence may be controlled so as to sequentially bias the hydraulic cylinders 54 from the highest positioned one downward.

In other words, in this case, the uppermost hydraulic cylinder 54 is biased, the valve shaft 60 opens the opening of the inlet side of the spool 50, and thereby the molten resin of only the uppermost spool 50 is led to the runner 16. Then, the middle hydraulic cylinder 54 is biased, the valve shaft 60 opens the opening of the inlet side of the spool 50, and thereby the molten resin of the uppermost and middle spools 50 is led to the runner 16.

Finally, the lowermost hydraulic cylinder 54 is biased, and the valve shaft 60 opens the opening of the inlet side of the spool 50. Thereby, the molten resin of all the uppermost, middle, and lowermost spools 50 is led to the runner 16.

As described above, by providing more than one temperature rising part 42 and path opening/closing part so that they replenish the filling amount to one another, even if the runner 16 and product part are wide, the molten resin can be supplied to the cavity without exclusively increasing the injection pressure and mold clamping force, and a molded product can have excellent external appearance quality without a weld.

The present invention is not to be limited to the embodiments described above, and may be modified in various ways without departing from its spirit and essential characteristics.

For example, in the embodiments, the temperature rising part 1040 or 42 is formed by winding the band heater 1056 or 46 around the static mixer 1054 or 44. The temperature rising part 1040 or 42 may be formed by burying a coil heater or a cartridge heater in the static mixer 1054 or 44.

Further, a stirring part is not to be limited to the static mixer 1054 or 44. For example, it may be a screw that is rotated by power.

A stirring part is not indispensable. It may be omitted when a straight tube with a small diameter and small temperature variations is used for the temperature rising parts 1040 or 42, for example.

Further, it is needless to say that an air cylinder can be used instead of the hydraulic cylinder 54 or 100.

Further, when the remained molten resin 1100 in the temperature rising part 1040 can be formed as a skin layer in the spool 1044, runner 1046, and gate 1048, it is unnecessary to provide the slag well 1086.

In the cobwebbing prevention part 1042, a member for accelerating heat radiation may be provided by externally fitting a radiation ring to the tubular member 1062.

Figure 30:
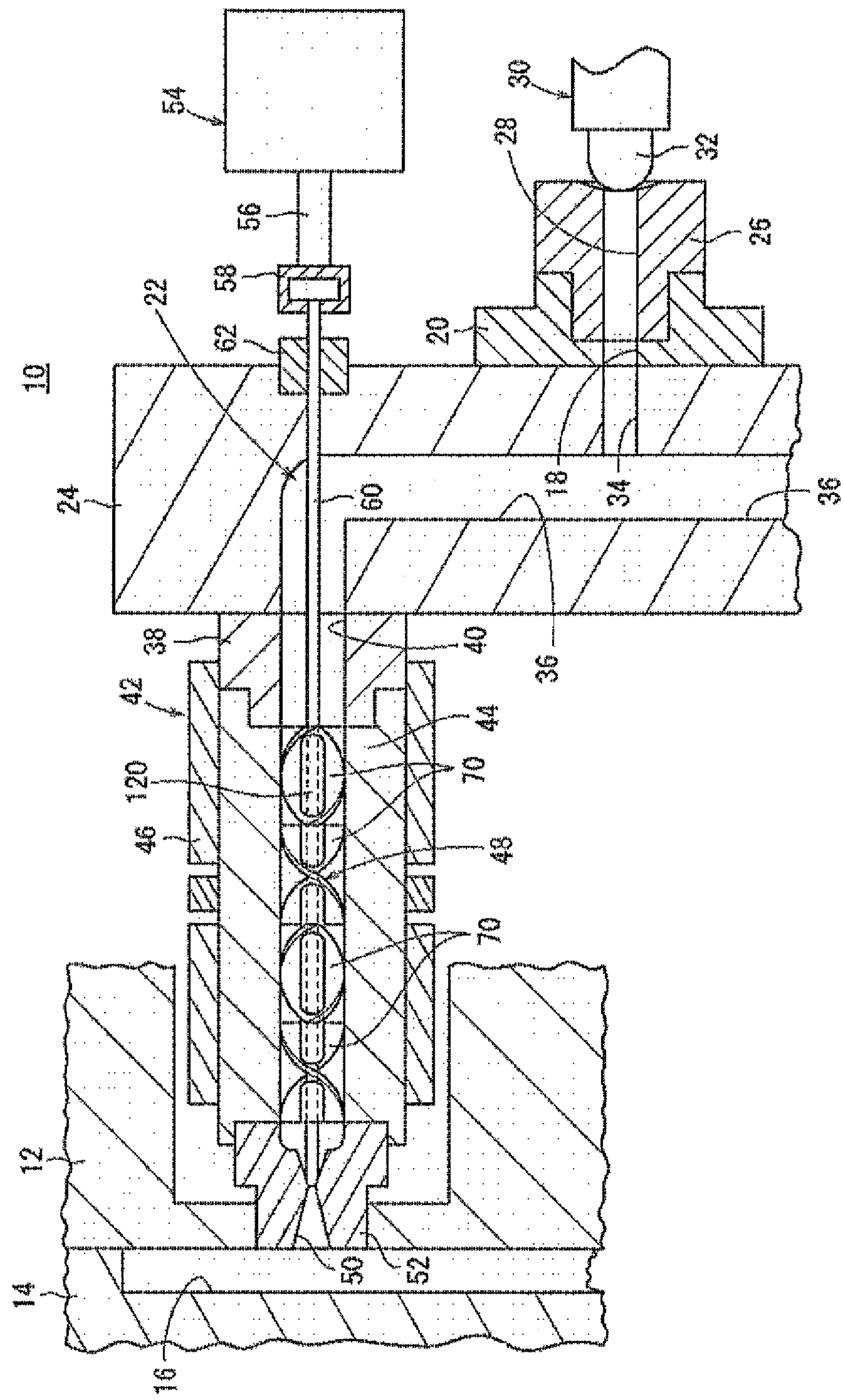
FIG. 30 is a schematic longitudinal sectional view of relevant parts of an injection molding apparatus in which a valve shaft (a valve member) is inserted into a tubular member, and passed through an insertion hole of a stirring part.

Further, as shown in FIG. 30, a pipe 120 (a tubular member) may be passed through the insertion hole formed in the mixing blade 48. In this case, the valve shaft 60 may be passed through a through-hole of the pipe 120. In other words, the valve shaft 60 is passed through the insertion hole through the through-hole of the pipe 120.

Even in this case, it is possible to avoid deformation of the mixing blade 48.

According to the above embodiment, an injection molding method for obtaining a molded product by filling molten resin in a product part formed in a mold may include a step of injecting molten resin obtained by melting resin in an injector 1032 or 30 from the injector 1032 or 30, a step of increasing a temperature of the molten resin flowing in a hot runner 1020 or 22 to be higher than a melting temperature in the injector 1032 or 30 by passing through a temperature rising part 1040 or 42 provided in a part of the hot runner 1020 or 22, and a step of leading the molten resin passed through the temperature rising part 1040 or 42 to a product part.

Further, according to the above embodiment, an injection molding apparatus configured to obtain a molded product by filling molten resin in a product part formed in a mold may comprise an injector 1032 or 30 which obtains molten resin by melting resin, and injects the molten resin, a hot runner 1020 or 22 which is a flowing path of the molten resin, and a temperature rising part 1040 or 42 which is provided in a part of the hot runner 1020 or 22, and increases a temperature of the molten resin to be higher than a melting temperature in the injector 1032 or 30.

According to the method and apparatus, a temperature of molten resin flowing in a hot runner is increased to be higher than a melting temperature in an injector by passing through a temperature rising part, and a viscosity of the molten resin is lowered at the same time. Thus, it is possible to increase a molten resin flowing distance.

In other words, for example, even when a product part includes a portion forming a thin portion, the molten resin temperature is high, heat of a mold is difficult to be removed, and the molten resin easily passes through the portion while maintaining a low viscosity, and reaches an end portion of the product part. Thus, it is possible to obtain a molded product free from occurrence of a defect.

Besides, time to keep the molten resin at a high temperature is shorter than when setting a high resin melting temperature in an injector. This prevents weakening of a molded product caused by a change in physical properties of molten resin, and occurrence of a defect in external appearance of a molded product due to generation of gas. In other words, an obtained molded product has a sufficient strength.

Further, to ensure the strength of a molded product, as long as controlling a temperature of the temperature rising part and the time to be held at a high temperature, it is unnecessary to optimize injection conditions by repeating a test as in the case of using a multipoint gate. In addition, as it is unnecessary to use a multipoint gate, a possibility of generating a weld line is eliminated, and the mold cost is not increased.

Further, in this case, it is unnecessary to increase the molten resin injection pressure for increasing the molten resin flowing distance. Thus, there is no need to increase the mold clamping pressure for avoiding generation of burrs when the injection pressure is increased.

For the above reasons, it is possible to avoid an increase in the size and weight of an injection molding apparatus. Further, a compact displacement mechanism is generally inexpensive compared with a large one, and it is possible to avoid an increase of equipment investment.

The above method may further include a step of stirring the molten resin flowing in the temperature rising part 1040 or 42 by a stirring part 1054 or 44. Further, the above apparatus may comprise a stirring part 1054 or 44 for stirring the molten resin flowing in the temperature rising part 1040 or 42.

By the stirring, occurrence of temperature variations in molten resin can be avoided, and consequently, a temperature, consequently a viscosity of molten resin becomes substantially uniform. This avoids formation of a high viscous portion in molten resin, and it becomes easy to increase a flowing distance of the molten resin.

A stirring part may be provided with the static mixer 1054 or 44.

Stirring by the static mixer requires no power, and for example, an increase of power consumption for performing injection molding can be avoided. Further, heat transfer and shearing force given to molten resin can be adjusted depending on a shape and structure of a static mixer. Thus, it is possible to control a degree of temperature rise of molten resin while passing through a static mixer. Further, as a shearing force to molten resin can be controlled, an injection pressure of an injector can be lowered, and a load of the injector can be reduced.

The above method may further include a step of passing the molten resin that has passed through the temperature rising part 1040, through the cobwebbing prevention part 1042. The above apparatus may further comprise a cobwebbing prevention part 1042 provided on the downstream side of the temperature rising part 1040.

The cobwebbing prevention part prevents transfer of heat of a temperature rising part to the molded product, and can avoid cobwebbing while opening a mold.

After the first time injection molding is finished, molten resin may remain in a temperature rising part. The remained molten resin remains in the temperature rising part until the next injection molding is performed, and is kept in an increased temperature state. Thus, there is a possibility that the remained molten resin changes in physical properties. If the remained molten resin changed in physical properties is led to a product part in the next injection molding, there is a possibility of producing a molded product with an insufficient strength or unsatisfactory external appearance quality.

To prevent such a possibility, it is considerable to increase a distance of a flowing path from a temperature rising part to a product part. The remained molten resin causes a fountain flow when being pushed out by newly injected molten resin, and adheres to a wall surface of a flowing path as a skin layer. Thus, if a distance of a flowing path increases, the entire remained molten resin becomes a skin layer. The remained molten resin is prevented from being led to a product part. However, in this case, the size of the injection molding apparatus is increased.

Thus, the above method may further include a step of receiving the molten resin 1000 remained in the temperature rising part 1040 in the last injection by the slag well 1086 provided on the downstream side of the temperature rising part 1040 in the next injection. The above apparatus may further comprise the slag well 1086 provided on the downstream side of the temperature rising part 1040.

With the slag well 1086, the entire remained molten resin can become a skin layer in a flowing path from a temperature rising part to a product part without increasing the flowing path distance. Therefore, the size of the injection molding apparatus is not increased.

Further, the above apparatus may further comprise a path opening/closing part 60 that opens or closes an upstream side flowing path 40 or a downstream side flowing path 50 of a temperature rising part 42.

In this apparatus, for example, when the downstream side flowing path of the temperature rising part is closed, by this closing, the molten resin remained in the temperature rising part is isolated from the molten resin filled in the cavity during injection molding. Therefore, this interrupts heat transfer from the molten resin remained in the temperature rising part or its upstream side to the molten resin filled in the cavity. Thus, the molten resin filled in the cavity is efficiently cooled, and a cycle time to obtain a molded product is reduced.

In the above apparatus, the path opening/closing part may be configured as a so-called a valve gate. Namely, in this case, the path opening/closing part comprises a valve member 60 for opening or closing the upstream side flowing path 40 or the downstream side flowing path 50, and a displacement mechanism 54, 90, or 100 for displacing the valve member.

In the above apparatus, a stirring part 44 may be provided for stirring the molten resin flowing in the temperature rising part 42. By the stirring, it is possible to avoid occurrence of temperature variations in molten resin. Therefore, a temperature, consequently a viscosity of molten resin becomes substantially uniform. Thereby, formation of a high viscosity portion in molten resin can be avoided, and the molten resin flowing distance can be easily increased.

In the above apparatus, the valve member 60 may be extended in a direction parallel to a longitudinal direction of the stirring part 44, and a passageway 82, which communicates the inlet or outlet of the stirring part 44 with the upstream side flowing path or the downstream side flowing path, and is inclined to the longitudinal direction of the stirring part, may be provided.

In this structure, the valve member does not interfere the stirring part.

In the above apparatus, the valve member 60 may be extended in a direction inclined to the longitudinal direction of the stirring part.

Further, in the above apparatus, the stirring part 44 may be provided with a stirring blade 70, an insertion hole may be formed in the stirring blade 70, and the valve member 60 may be passed through the insertion hole.

In the above apparatus, the insertion hole may be formed in a portion other than a junction between the stirring blades 70.

The stirring blade is generally formed by joining a plurality of blades. However, when the insertion hole is formed in the junction, the joint strength is decreased. As long as the insertion hole is formed in a portion other than the joint between the stirring blades 70, even if the injection pressure is extremely increased, the stirring blade is not deformed.

In the above apparatus, a center axis of the stirring part 44 may be provided at a position offset with respect to the central axis of the upstream side flowing path or the downstream side flowing path.

In the above apparatus, the tubular member 120 may be inserted into the insertion hole, and the valve member 60 may be passed through the insertion hole through the through-hole of the tubular member 120.

In this structure, deformation of the stirring blade can be avoided.

In the above apparatus, the displacement mechanism 54 may be provided in the fixed mold 12, and the valve member 60 may open or close the downstream side flowing path 50.

In this structure, the molten resin in the temperature rising part is isolated from the molten resin in the cavity, the molten resin in the cavity can be efficiently cooled, and a cycle time to obtain a molded product can be easily reduced.

In the above apparatus, the displacement mechanism 90 or 100 may be provided in the movable mold 14, and the valve member 60 may open or close the downstream side flowing path 50.

In this structure, a molded product is supported by the valve member during mold opening. Therefore, the molded product is prevented from falling off.

In the above apparatus, a plurality of temperature rising parts 42 and path opening/closing parts 60 may be provided.

In this structure, even when the hot runner branches, the effects described above can be obtained.

The above apparatus may be configured so that the molten resin is individually supplied from each of the temperature rising parts 42 to the cavity by individually operating a plurality of path opening/closing parts 60.

In this structure, for example, when there is a wide portion in the cavity, molten resin can be densely filled in the portion by arranging a plurality of path opening/closing parts so that they replenish the filling amount each other.

DESCRIPTION OF REFERENCE NUMERALS AND SIGNS

1010: Injection molding apparatus
1012: Fixed mold
1014: Movable mold
1016, 1020: Hot runner
1032: Injector
1034: Injection nozzle
1040: Temperature rising part
1042: Cobwebbing prevention part
1044: Spool
1046: Runner
1048: Gate
1050: Product part
1054: Static mixer
1056, 1064: Band heater
1058: Mixing blade
1062: Tubular member
1066: Cobwebbing prevention ring
1078: Heat insulating member

1086: Slag well
1100: Remained molten resin
1102: Newly injected molten resin
10: Injection molding apparatus
12: Fixed mold
14: Movable mold
16: Runner
18: First hot runner
22: Second hot runner
30: Injector
32: Injection nozzle
34: Guide path
36: Branch path
38: Hot nozzle
40: Communication path
42: Temperature rising part
44: Static mixer
46: Band heater
48: Mixing blade
50: Spool
52: Nozzle tip
54, 100: Hydraulic cylinder
56, 102: Piston rod
60: Valve shaft
70: Stirring blade
72: Bypass block
82: Passageway
90: Motor
92: Rotation axis
94: Pinion gear
96: Rack
104: First cam member
106: Second cam member
108: Convex cam portion
110: Concave cam portion
120: Pipe

The invention claimed is:

1. An injection molding apparatus for obtaining a molded product by filling molten resin in a product part formed in a mold, comprising:

an injector which obtains molten resin by melting resin, and injects the molten resin, a hot runner which is a flowing path of the molten resin, a temperature rising part which is provided in a part of the hot runner, and increases a temperature of the molten resin to be higher than a melting temperature in the injector, a path opening/closing part which opens or closes an upstream side flowing path or a downstream side flowing path of the temperature rising part, and a stirring part provided with a stirring blade for stirring the molten resin flowing in the temperature rising part, wherein the path opening/closing part comprises a valve member for opening or closing the upstream side flowing path or the downstream side flowing path, and a displacement mechanism for displacing the valve member, wherein an insertion hole is formed in the stirring blade, and the valve member is passed through the insertion hole, and wherein a tubular member is inserted into the insertion hole, and the valve member is passed through the insertion hole through a through-hole of the tubular member.

2. The injection molding apparatus according to claim 1, wherein the stirring part includes a static mixer.

3. The injection molding apparatus according to claim 1, further comprising a cobwebbing prevention part provided on a downstream side of the temperature rising part.

4. The injection molding apparatus according to claim 1, further comprising a slag well provided on a downstream side of the temperature rising part.

5. The injection molding apparatus according to claim 1, wherein the valve member is extended in a direction parallel to a longitudinal direction of the stirring part.

6. The injection molding apparatus according to claim 1, wherein a center axis of the stirring part is provided at a position offset with respect to a central axis of the upstream side flowing path or the downstream side flowing path.

7. The injection molding apparatus according to claim 1, wherein the displacement mechanism is provided in a fixed mold, and the valve member opens or closes the downstream side flowing path.

8. The injection molding apparatus according to claim 1, wherein two or more the temperature rising part and path opening/closing part are provided.

9. The injection molding apparatus according to claim 8, wherein the molten resin is individually supplied from the two or more of the temperature rising parts to the cavity by individually operating the path opening/closing parts.

* * * * *